US012729152B2

(12) United States Patent
Choi et al.

(10) Patent No.: US 12,729,152 B2

(45) Date of Patent: Sep. 8, 2026

(54) COMPOSITION FOR ECO-FRIENDLY INFRARED TRANSMISSIVE GLASS AND METHOD FOR MANUFACTURING OPTICAL GLASS USING THE SAME

(71) Applicant: KOREA PHOTONICS TECHNOLOGY INSTITUTE, Gwangju (KR)

(72) Inventors: Juhyeon Choi, Gwangju (KR); Seonhoon Kim, Gwangju (KR); Weesam Lee, Gwangju (KR); Jeonghwan In, Gwangju (KR)

(73) Assignee: KOREA PHOTONICS TECHNOLOGY INSTITUTE, Gwangju (KR)

( * ) Notice: Subject to any disclaimer, the term of this patent is extended or adjusted under 35 U.S.C. 154(b) by 527 days.

(21) Appl. No.: 17/640,208

(22) PCT Filed: Sep. 10, 2021

(86) PCT No.: PCT/KR2021/012367

§ 371 (c)(1),
(2) Date: Mar. 3, 2022

(87) PCT Pub. No.: WO2022/060018

PCT Pub. Date: Mar. 24, 2022

(65) Prior Publication Data

US 2025/0083993 A1 Mar. 13, 2025

(30) Foreign Application Priority Data

Sep. 16, 2020 (KR) ........................ 10-2020-0119159

(51) Int. Cl.
*C03C 4/10* (2006.01)
*C03C 3/32* (2006.01)

(52) U.S. Cl.
CPC ................ *C03C 3/321* (2013.01); *C03C 4/10* (2013.01)

(58) Field of Classification Search
CPC .............. C03C 3/321; C03C 3/32; C03C 4/10
See application file for complete search history.

(56) References Cited

U.S. PATENT DOCUMENTS 3,511,992 A * 5/1970 Patterson .................. C03C 4/10 501/40
5,846,889 A * 12/1998 Harbison .................. C03C 4/12 65/390
6,015,765 A * 1/2000 Harbison ................ C03C 3/323 501/40
2012/0135850 A1* 5/2012 Aitken .................... C03C 3/321 501/40
2013/0278999 A1* 10/2013 Carlie ....................... C03C 3/32 359/356
2017/0334768 A1* 11/2017 Baleine ................ G02B 3/0087

FOREIGN PATENT DOCUMENTS

CN 108503215 A 9/2018
KR 10-2016-0149159 12/2016
KR 10-1756747 7/2017
KR 1756747 B1 * 7/2017
KR 101756747 B1 * 7/2017 ............ C03C 3/321
KR 10-2020-0003267 1/2020
WO WO-2014085237 A1 * 6/2014 ............... C03C 4/18
WO WO-2015073282 A1 * 5/2015 ............... C03C 4/10
WO WO-2018112386 A1 * 6/2018 ............ C03C 3/321

OTHER PUBLICATIONS

English Specification of KR 10-1756747 Jul. 12, 2017.
English Specification of KR 10-2020-0003267 Jan. 8, 2020.
English Specification of KR 10-2016-0149159 Dec. 27, 2016.
English Specification of CN108503215A, Sep. 7, 2018.

* cited by examiner

*Primary Examiner* — Elizabeth A. Bolden
(74) *Attorney, Agent, or Firm* — Dinsmore & Shohl LLP; Yongsok Choi, Esq.

(57) ABSTRACT

A composition for eco-friendly infrared transmissive glass and a method for optical glass using the same are disclosed. According to an embodiment of the present invention, there is provided a method for manufacturing optical glass transmitting an infrared wavelength band of light by a preset reference value or more, comprising mixing preset contents of Ge, Ga, and Se and charging the mixture into a preset container, performing fusion on the preset container in a first preset environment, and gradually cooling the container in a second preset environment.

2 Claims, 20 Drawing Sheets

FIG. 14
| classifications | Ge(mol%) | Ga(mol%) | Se(mol%) | Te(mol%) |
|---|---|---|---|---|
| 210 | 35 | 5 | 60 | 0 |
| GGSe-1Te | 35 | 5 | 59 | 1 |
| GGSe-3Te | 35 | 5 | 57 | 3 |
| GGSe-5Te | 35 | 5 | 55 | 5 |
| GGSe-7Te | 35 | 5 | 53 | 7 |
FIG. 15A
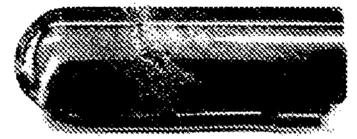
FIG. 15B
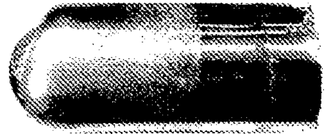
FIG. 15C
FIG. 15D
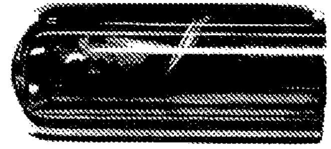

FIG. 24

| | refractive index | | | |
|---|---|---|---|---|
| wavelength(μm) | GGSe-1Te | GGSe-3Te | GGSe-5Te | GGSe-7Te |
| 3 | 2.54499 | 2.56411 | 2.58702 | 2.61009 |
| 4 | 2.53977 | 2.55875 | 2.58149 | 2.60437 |
| 5 | 2.53638 | 2.55531 | 2.57799 | 2.6008 |
| 6 | 2.53347 | 2.55237 | 2.57502 | 2.59783 |
| 7 | 2.53061 | 2.54952 | 2.57219 | 2.59496 |
| 8 | 2.52754 | 2.54646 | 2.56919 | 2.592 |
| 9 | 2.52414 | 2.54309 | 2.56589 | 2.58877 |
| 10 | 2.5204 | 2.53941 | 2.5623 | 2.58523 |
| 11 | 2.5162 | 2.53529 | 2.55826 | 2.58122 |
| 12 | 2.51148 | 2.53066 | 2.55372 | 2.57674 |
| | | | | |
| **dispersion** | **94.67** | **97.43** | **100.99** | **103.88** |

FIG. 25

| classifications | Ge(mol%) | Ga(mol%) | Se(mol%) | S(mol%) |
|---|---|---|---|---|
| 220 | 35 | 5 | 60 | 0 |
| GGSe -2.5S | 35 | 5 | 57.5 | 2.5 |
| GGSe -5S | 35 | 5 | 55 | 5 |
| GGSe -7.5S | 35 | 5 | 52.5 | 7.5 |
| GGSe -10S | 35 | 5 | 50 | 10 |
| GGSe -20S | 35 | 5 | 40 | 20 |
| GGSe -30S | 35 | 5 | 30 | 30 |
| GGSe -40S | 35 | 5 | 20 | 40 |
| GGSe -50S | 35 | 5 | 10 | 50 |
| GGSe -60S | 35 | 5 | 0 | 60 |

FIG. 36

| | refractive index | | |
|---|---|---|---|
| wavelength(μm) | GGSe-2.5S | GGSe-5.0S | GGSe-7.5S |
| 3 | 2.51694 | 2.50664 | 2.49634 |
| 4 | 2.51439 | 2.50289 | 2.49139 |
| 5 | 2.51109 | 2.49952 | 2.48795 |
| 6 | 2.50815 | 2.4948 | 2.48481 |
| 7 | 2.50519 | 2.49363 | 2.48156 |
| 8 | 2.50206 | 2.49027 | 2.47806 |
| 9 | 2.49851 | 2.48651 | 2.47411 |
| 10 | 2.49453 | 2.48229 | 2.46968 |
| 11 | 2.49001 | 2.47751 | 2.46458 |
| 12 | 2.48492 | 2.473 | 2.4602 |
| | | | |
| dispersion | 87.2 | 85.8 | 82.3 |

COMPOSITION FOR ECO-FRIENDLY INFRARED TRANSMISSIVE GLASS AND METHOD FOR MANUFACTURING OPTICAL GLASS USING THE SAME

CROSS-REFERENCE TO RELATED APPLICATION

The instant patent application claims priority under 35 U.S.C. 119(a) to Korean Patent Application No. 10-2020-0119159, filed on Sep. 16, 2020, in the Korean Intellectual Property Office, the disclosure of which is herein incorporated by reference in its entirety. The present patent application claims priority to other applications to be filed in other countries, the disclosures of which are also incorporated by reference herein in their entireties.

TECHNICAL FIELD

The present invention relates to a composition for infrared transmissive glass that does not contain harmful materials, such as As or Sb, among the chalcogens and a method for manufacturing optical glass using the same.

BACKGROUND ART

The description of the Discussion of Related Art section merely provides information that may be relevant to embodiments of the disclosure but should not be appreciated as necessarily constituting the prior art.

Infrared cameras have been mainly used for special purposes, such as night vision goggles in military industry and are recently in wide use for civil purposes, such as vehicle night vision, biometrics, and fire monitoring. In particular, as modular infrared cameras mountable in smartphones are commercially available, there is a likelihood to apply infrared cameras to various electronic devices and daily life in the future.

Infrared cameras are divided into mid-infrared band (3 μm to 5 μm) cameras and far-infrared band (8 μm to 12 μm) cameras. An infrared camera is a device that visualizes the wavelength emitted by an object according to the temperature, as a thermal image, by the principle of the blackbody radiation. The mid-infrared camera may visualize the wavelength emitted by a hot object, such as flame. The far-infrared camera visualizes the peak wavelength (up to 10 μm) of the blackbody radiation spectrum emitted by the body temperature of a warm-blooded animal.

The infrared camera may include a lens formed of optical glass that transmits infrared light. The lens focuses infrared light so that a sensor in the infrared camera may sense the infrared light.

The material of the conventional optical glass transmitting infrared light contains arsenic (As) and antimony (Sb), which are heavy metal elements. Such elements need to be included in the material of the conventional optical glass to be able to secure sufficient optical properties (e.g., refractive index, dispersion, or variations in refractive index depending on temperature. However, due to the heavy metal elements included in the material, problems occur in various processes, such as the manufacturing process, the process of using optical components containing the material, or the post-processing of expired optical components.

DETAILED DESCRIPTION OF THE INVENTION

Technical Problem

An object of an embodiment of the present invention is to provide an eco-friendly composition for infrared transmissive glass that does not contain harmful materials, such as As (arsenic) or Sb (antimony) and a method for manufacturing optical glass using the same.

Another object of the present invention is to provide an eco-friendly composition for infrared transmissive glass having sufficient optical properties without a heavy metal component and a method for manufacturing optical glass using the same.

Technical Solution

According to an aspect of the present invention, there is provided a method for manufacturing optical glass transmitting an infrared wavelength band of light by a preset reference value or more, comprising mixing preset contents of Ge, Ga, and Se and charging the mixture into a preset container, performing fusion on the preset container in a first preset environment, and gradually cooling the container in a second preset environment.

According to an aspect of the present invention, 50 mol % to 70 mol % of Se and 30 mol % to 50 mol % of Ge and Ga are charged into the preset container, and wherein Ge and Ga are charged in a ratio of 3 to 15:1.

According to an aspect of the present invention, the fusion is performed on the preset container at 900° C. to 1000° C. for a preset time, while the container is shaken.

According to an aspect of the present embodiment, the preset time is 12 hours.

According to an aspect of the present invention, in gradually cooling the container, the container after fusion is gradually cooled at a glass transition temperature for a preset time.

According to an aspect of the present embodiment, the preset time is 3 hours.

According to an aspect of the present invention, there is provided a composition for glass transmitting an infrared wavelength band of light by a preset reference value or more, wherein the composition comprises 22.5 mol % to 46.875 mol % of Ge, 1.875 mol % to 12.5 mol % of Ga, 43 mol % to 69 mol % of Se, and 1 mol % to 7 mol % of Te.

According to an aspect of the present invention, there is provided a method for manufacturing optical glass transmitting an infrared wavelength band of light by a preset reference value or more, comprising mixing preset contents of Ge, Ga, Se, and Te and charging the mixture into a preset container, performing fusion on the preset container in a first preset environment, and gradually cooling the container in a second preset environment.

According to an aspect of the present invention, in charging the mixture, x mol % of Te, (50−x) mol % to (70−x) mol % of Se, and 30 mol % to 50 mol % of Ga are charged into the preset container, and wherein Ge and Ga are charged in a ratio of 3 to 15:1.

According to an aspect of the present invention, 1 mol % to 7 mol % of Te is charged into the preset container.

According to an aspect of the present invention, the fusion is performed on the preset container at 900° C. to 1000° C. for a preset time.

According to an aspect of the present invention, there is provided a composition for glass transmitting an infrared wavelength band of light by a preset reference value or more, wherein the composition comprises 22.5 mol % to 46.875 mol % of Ge, 1.875 mol % to 12.5 mol % of Ga, 43 mol % to 69 mol % of Se, and 1 mol % to 7 mol % of Te.

According to an aspect of the present invention, there is provided a method for manufacturing optical glass transmitting an infrared wavelength band of light by a preset reference value or more, comprising mixing preset contents of Ge, Ga, Se, and S and charging the mixture into a preset container, performing fusion on the preset container in a first preset environment, and gradually cooling the container in a second preset environment.

According to an aspect of the present invention, in charging the mixture, x mol % of Te, (50−x) mol % to (70−x) mol % of Se, and 30 mol % to 50 mol % of Ga are charged into the preset container, and wherein Ge and Ga are charged in a ratio of 3 to 15:1.

According to an aspect of the present invention, 10 mol % to 50 mol % of S is charged into the preset container.

According to an aspect of the present invention, there is provided a composition for glass transmitting an infrared wavelength band of light by a preset reference value or more, wherein the composition comprises 22.5 mol % to 46.875 mol % of Ge, 1.875 mol % to 12.5 mol % of Ga, 10 mol % to 57.5 mol % of Se, and 2.5 mol % to 50 mol % of S.

According to an aspect of the present invention, there is provided a composition for glass transmitting an infrared wavelength band of light by a preset reference value or more, wherein the composition comprises preset contents of Ge, Ga, and Se without a heavy metal element, such as As (arsenic), Sb (antimony), Pb (lead), Br (bromine) or La (lanthanum), or comprises a preset content of Te or S in addition to Ge, Ga, and Se.

Advantageous Effects

As described above, an embodiment of the present invention has an advantage of being eco-friendly due to absence of a heavy metal element.

Further, an embodiment of the present invention has an advantage of having sufficient optical properties to be used in optical components without including a heavy metal element.

BRIEF DESCRIPTION OF THE DRAWINGS

FIG. 14 is a view illustrating the content of components constituting a composition for far-infrared transmissive glass according to a second embodiment of the present invention.

FIG. 15 is a view illustrating optical glass manufactured with a composition according to the second embodiment of the present invention.

FIG. 24 is a view illustrating the dispersion value of a composition according to the second embodiment of the present invention.

FIG. 25 is a view illustrating the content of components constituting a composition for far-infrared transmissive glass according to a third embodiment of the present invention.

FIG. 36 is a view illustrating the dispersion value of a composition according to the third embodiment of the present invention.

MODE FOR CARRYING OUT THE INVENTION

Various changes may be made to the present invention, and the present invention may come with a diversity of embodiments. Some embodiments of the present invention are shown and described in connection with the drawings. However, it should be appreciated that the present disclosure is not limited to the embodiments, and all changes and/or equivalents or replacements thereto also belong to the scope of the present disclosure. Similar reference denotations are used to refer to similar elements throughout the drawings.

The terms "first" and "second" may be used to describe various components, but the components should not be limited by the terms. The terms are used to distinguish one component from another. For example, a first component may be denoted a second component, and vice versa without departing from the scope of the present disclosure. The term "and/or" may denote a combination(s) of a plurality of related items as listed or any of the items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

The terms as used herein are provided merely to describe some embodiments thereof, but not to limit the present disclosure. As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the present disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Figure 1:
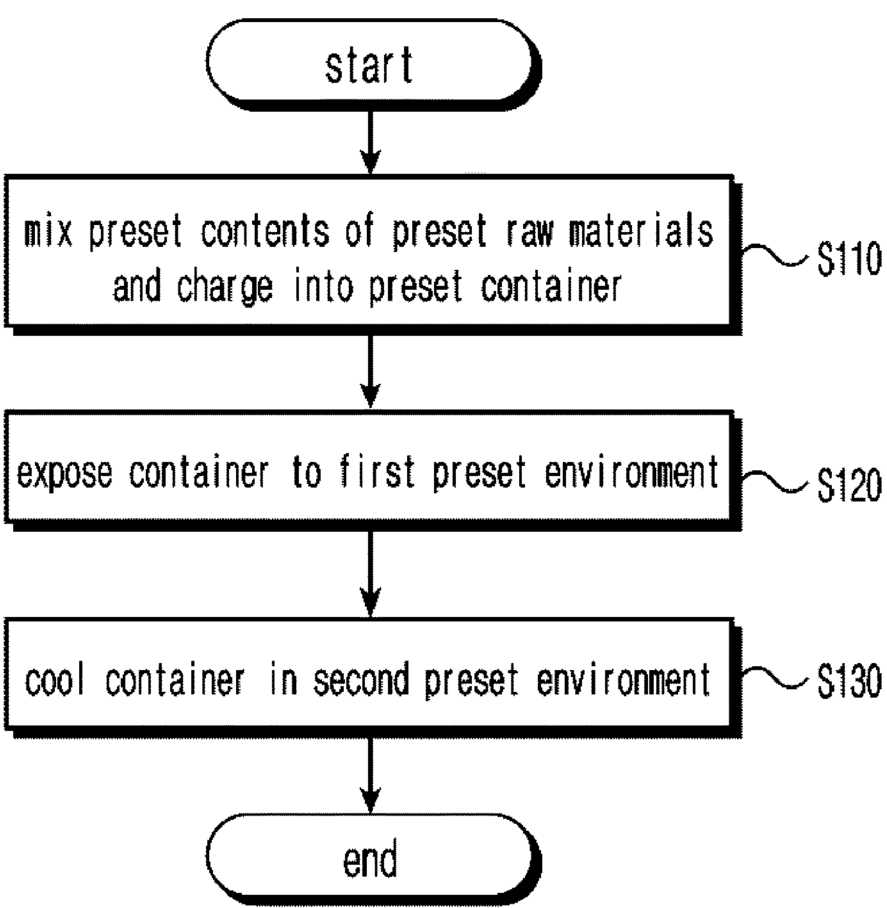
FIG. 1 is a flowchart illustrating a method for manufacturing a far-infrared transmissive optical glass according to an embodiment of the present invention.

FIG. 1 is a flowchart illustrating a method for manufacturing a far-infrared transmissive optical glass according to an embodiment of the present invention.

The composition for glass is manufactured into far-infrared transmissive optical glass through a manufacturing process to be described below. The far-infrared transmissive glass has a transmittance larger than or equal to a preset reference value for light in a far-infrared wavelength band among incident light. Far-infrared transmissive glass may be adopted and used in various forms not only in the military industry but also in the civil field, such as being built in infrared cameras, smart devices, or home appliances. Far-infrared transmissive glass may be used as glass itself but, in many cases, it is shaped into optical components, such as lenses. Accordingly, according to an embodiment of the present invention, raw materials forming the composition for far-infrared transmissive glass are mixed in a preset ratio and go through a manufacturing process to be described below, forming far-infrared transmissive optical glass securing superior optical/physical properties even without including heavy metals or harmful elements, such as As (arsenic), Sb (antimony), Pb (lead), Br (bromine) or La (lanthanum).

Preset raw materials in their respective preset amounts are mixed and charged into a preset container (S110).

The raw materials constituting the composition for glass may include a main component and a dopant. The main component is a component that must be included in order for raw materials to be manufactured into a composition for far-infrared transmissive glass or far-infrared transmissive glass. The main component includes Ge (germanium), Ga (gallium) and Se (selenium). Se is included in 50 mol % to 70 mol %, and Ge and Ga are included in a preset mol % ratio within the remaining content. Here, the preset ratio of Ge to Ga may be 3 to 15:1. For example, when 60 mol % of Se is included, Ge may be included in an amount of 30 mol % to 37.5 mol %, and Ga may be included in an amount of 2.5 mol % to 10 mol %. As the selected components in the above-described amounts are included as the main component of the raw materials, it is possible to secure a glass formation area. Further, by appropriately adjusting the contents of the selected components, it is possible to secure excellent optical properties, such as far-infrared transmittance or refractive index for the final far-infrared lens even without containing any heavy metal.

The raw materials constituting the composition for glass may include a dopant in addition to the main component. The dopant, which is included along with the raw materials, is a component that enhances specific optical properties, such as refractive index or dispersion, while maintaining the other optical properties of the optical glass to be manufactured. The dopant may include Te (tellurium) or S (sulfur). Se is less included as much as the amount of dopant included. For example, in the case where Se is included by 60 mol % as in the above-described example, if 5 mol % of Te is included, only 55 mol % of Se is included. As such, the dopant may be additionally included, presenting superior optical properties in terms of refractive index or dispersion.

The raw materials including the main component or the main component and the dopant are mixed and charged into a preset container. The preset container may be a quartz tube. The raw materials are mixed and charged in a container, such as a quartz tube. If the raw materials are charged, the preset container is sealed in a vacuum state. If not in a vacuum state, the raw materials may be combined with oxygen in the air so that the properties of the raw materials may be changed. Accordingly, the raw materials are charged into the preset container and are sealed in a vacuum state.

The container containing the raw materials is exposed to a first preset environment (S120).

The quartz tube is exposed to the first preset environment. Here, the first preset environment may be an environment of exposure to a temperature of 900° C. to 1000° C. for about 12 hours. The quartz tube may be put into a device, such as a locking electric furnace, and exposed to a temperature of 900° C. to 1000° C. so that the raw materials in the quartz tube are fused.

The container that has undergone the fusion process of the raw materials is slowly cooled in a second preset environment (S130).

The quartz tube is slowly cooled in the second preset environment. Here, the second preset environment may be an environment of exposure to a glass transition temperature for about 3 hours. The glass transition temperature varies depending on the characteristics of the raw materials, and the quartz tube is slowly cooled at the glass transition temperature determined depending on the raw materials charged in the quartz tube. The raw materials in the quartz tube are formed into far-infrared transmissive optical glass by being slowly cooled at the glass transition temperature for about 3 hours.

Figure 2:
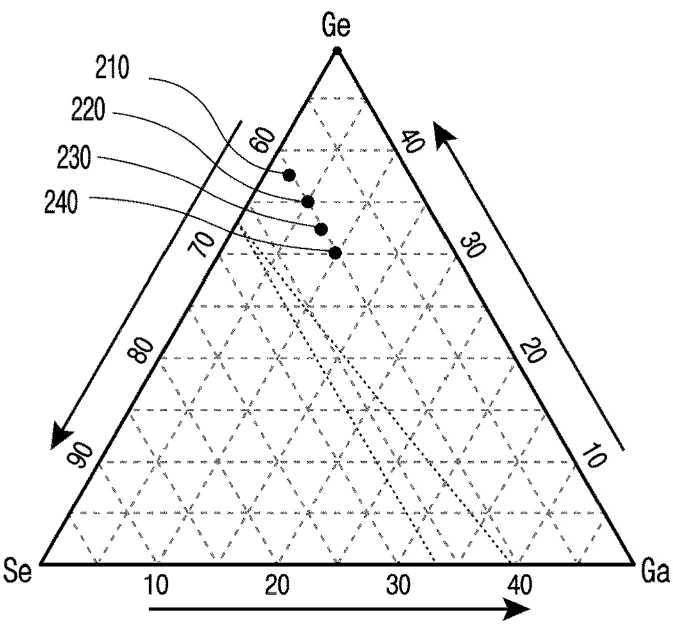
FIG. 2 is a ternary system illustrating the content of components constituting a composition for far-infrared transmissive glass according to a first embodiment of the present invention.
Figure 3A:
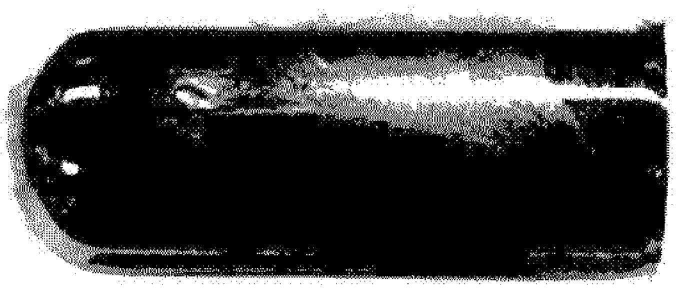
FIG. 3 is a view illustrating optical glass manufactured with a composition according to the first embodiment of the present invention.
Figure 3B:
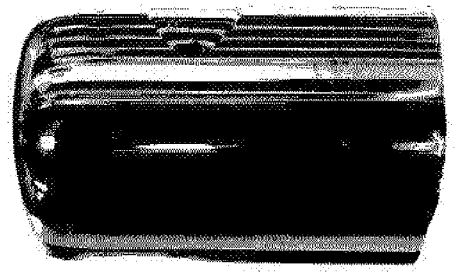
Figure 3C:
Figure 3D:
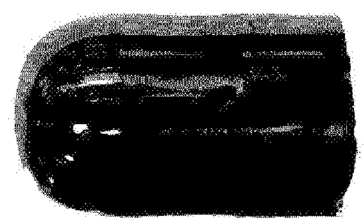

FIG. 2 is a ternary system illustrating the content of components constituting a composition for far-infrared transmissive glass according to a first embodiment of the present invention.

A composition for far-infrared transmissive glass according to a first embodiment of the present invention (hereinafter, simply referred to as a 'first composition') refers to a composition in which the raw materials are included in the following quantities.

1) Ge: 37.5 mol %, Ga: 2.5 mol %, Se: 60 mol % (210)
2) Ge: 35 mol %, Ga: 5 mol %, Se: 60 mol % (220)
3) Ge: 32.5 mol %, Ga: 7.5 mol %, Se: 60 mol % (230)
4) Ge: 30 mol %, Ga: 10 mol %, Se: 60 mol % (240)

Se is included as much as 60 mol % of 50 mol % to 70 mol %, and Ge and Ga are included by a 3:1 ratio 240 through 15:1 ratio 210 within 40 mol %.

The optical glass formed of the first composition including the raw material in the above-described contents is shown in FIG. 3.

FIG. 3 is a view illustrating optical glass manufactured with a composition according to the first embodiment of the present invention. Here, the manufactured optical glass may be grown to have a diameter of a preset reference value, e.g., 35 mm or more, and may have an ingot shape. The optical glass manufactured with the composition according to the first embodiment of the present invention may grow into a diameter of up to 60 mm.

FIGS. 3A to 3D show the glass implemented with the first compositions 210 to 240, respectively. Referring to FIGS. 3A to 3D, it could be identified that crystallization did not proceed in each first composition as they were implemented into glass.

Figure 4:
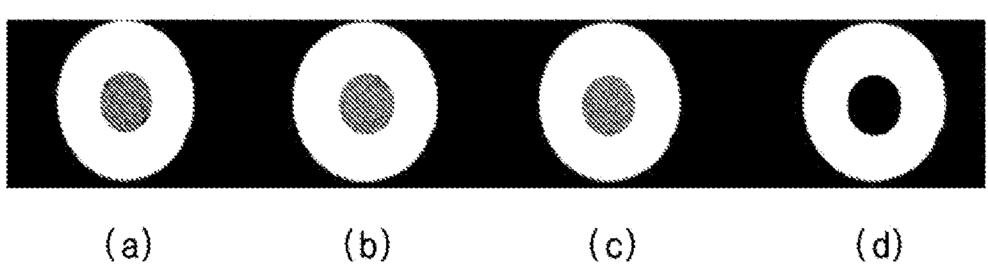
FIG. 4 is a view illustrating measuring internal defects in optical glass manufactured with a composition according to the first embodiment of the present invention.

FIG. 4 is a view illustrating measuring internal defects in optical glass manufactured with a composition according to the first embodiment of the present invention.

FIGS. 4*a* to 4*d* are photos of measuring the internal defects of the optical glasses 210 to 240. To measure the internal defects, far-infrared light is radiated to the manufactured optical glass. When there is no internal defect, the black central portion is captured in light black due to high transmittance of far-infrared light. In contrast, if there is an internal defect, the transmittance of far-infrared light reduces, so that the black central portion is captured in relatively dark black. Referring to FIGS. 4A to 4C, it could be identified that the optical glasses 210 to 230 had superior far-infrared transmittance because they had no internal defect. Meanwhile, referring to FIG. 4D, it may be identified that the optical glass 240 has excellent far-infrared transmittance although relatively low.

Figure 5:
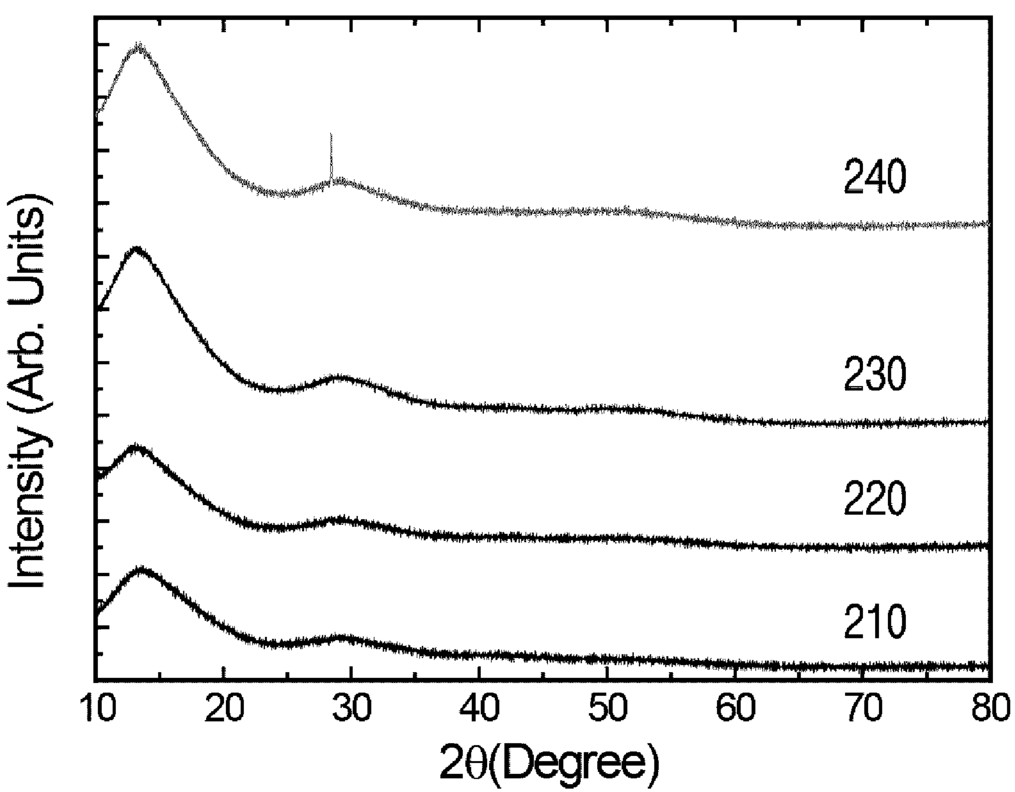
FIG. 5 is a graph illustrating properties for identifying vitrification of a composition according to the first embodiment of the present invention.

FIG. 5 is a graph illustrating properties for identifying vitrification of a composition according to the first embodiment of the present invention.

FIG. 5 is a graph illustrating the characteristics when each first composition is implemented with 35 mm optical glass. It may be identified that the optical glasses 210 to 240 have been vitrified without a crystallization peak Peak at every angle. In other words, it may be identified that each optical glass implemented from the first composition may have excellent far-infrared light transmittance because crystallization does not occur therein.

Figure 6:
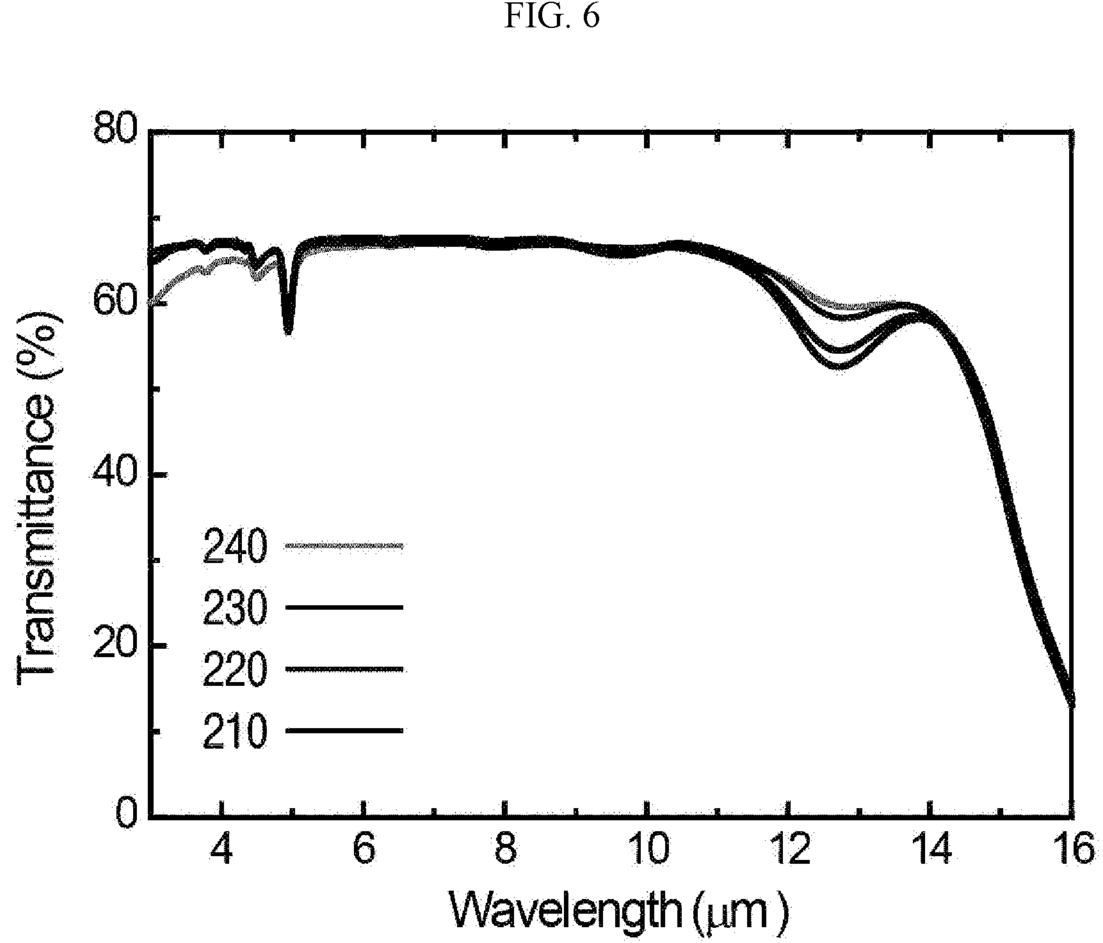
FIG. 6 is a graph illustrating the transmittance in a far-infrared wavelength band of a composition according to the first embodiment of the present invention.

FIG. 6 is a graph illustrating the transmittance in a far-infrared wavelength band of a composition according to the first embodiment of the present invention.

FIG. 6 is a graph illustrating the characteristics when each first composition is implemented with 4 mm optical glass. It could be identified that each optical glass 210 to 240 had an average transmittance of 60% or more in the 8 to 12 μm band, which is a far-infrared wavelength band. More specifically, the optical glass 210 exhibited an average transmittance of 61.87%, the optical glass 220 64.54%, the optical glass 230 64.40%, and the optical glass 240 63.98%.

The decrease in the transmittance of far-infrared light in the 12 μm band is due to the combination of Ge and 0, and it could be identified that the transmittance decreased as Ge relatively decreased with the increase in Ga.

Figure 7:
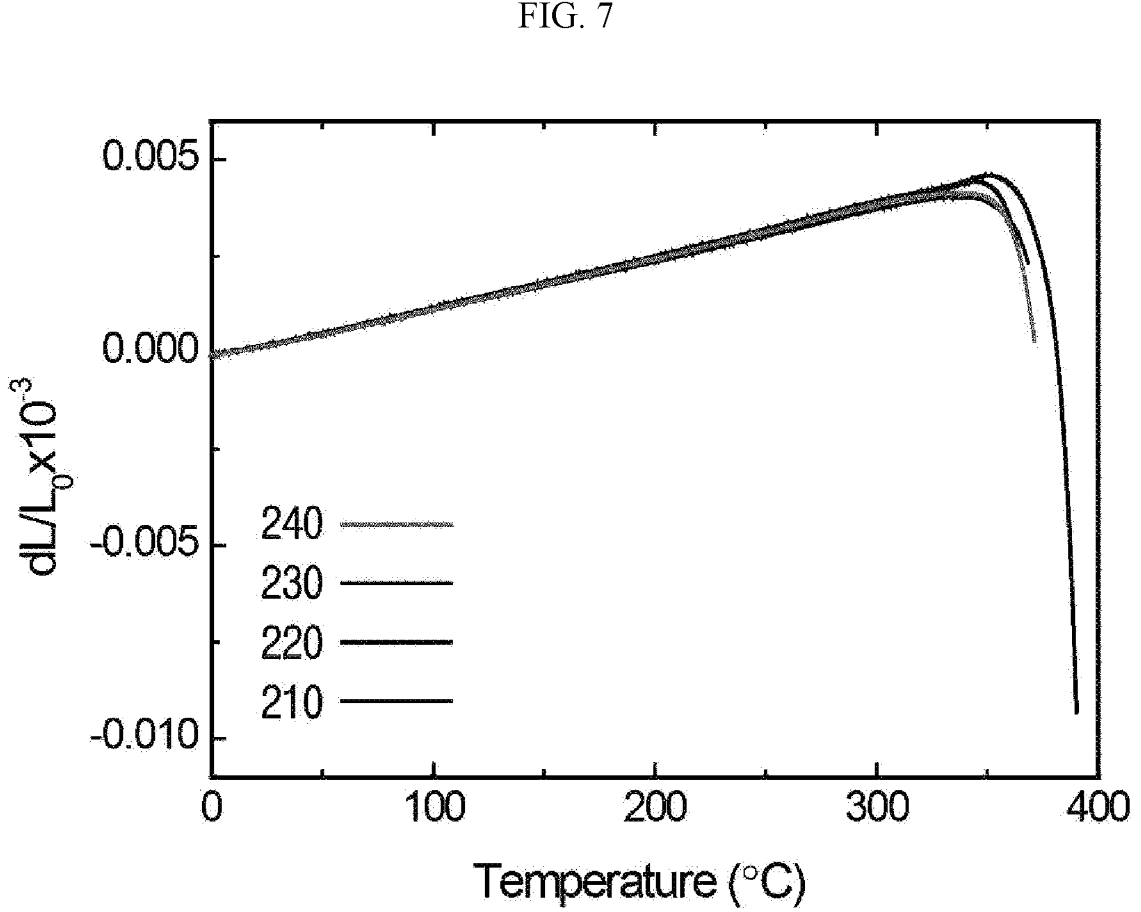
FIG. 7 is a graph illustrating the thermal expansion coefficient of a composition according to the first embodiment of the present invention.

FIG. 7 is a graph illustrating the thermal expansion coefficient of a composition according to the first embodiment of the present invention.

All of the optical glasses 210 to 240 exhibited a significantly low change in thermal expansion coefficient even at a temperature change of about 350° C. If the thermal expansion coefficient is rapidly changed according to the temperature, the shape of optical glass is changed according to the temperature change. Only glass may be relatively less influenced by a shape change. However, if glass is manufactured into an optical component, the optical properties of the optical component may change. The optical glasses 210 to 240 had significantly low thermal expansion coefficients of $12.9531\times10^{-6}$ K, $12.8806\times10^{-6}$ K, $12.3196\times10^{-6}$ K, and $12.5219\times10^{-6}$, respectively, and there was no trend according to the change in the content of the component. This becomes clearer when compared with the thermal expansion coefficient of the conventional (heavy metal-containing) far-infrared transmissive glass that is commercially available. Among conventional (heavy metal-containing) far-infrared transmissive glasses, a product with excellent thermal expansion coefficient (IRG 22 from Schott) exhibited $12.5\times10^{-6}$ K, and others exhibited $14.0\times10^{-6}$ K (IRG 25 from Schott), $20.0\times10^{-6}$ K (IRG 24 from Schott), or $21.4\times10^{-6}$ K (IRG 26 from Schott). Referring to these, it could be identified that each optical glass 210 to 240 had an excellent thermal expansion coefficient.

Figure 8:
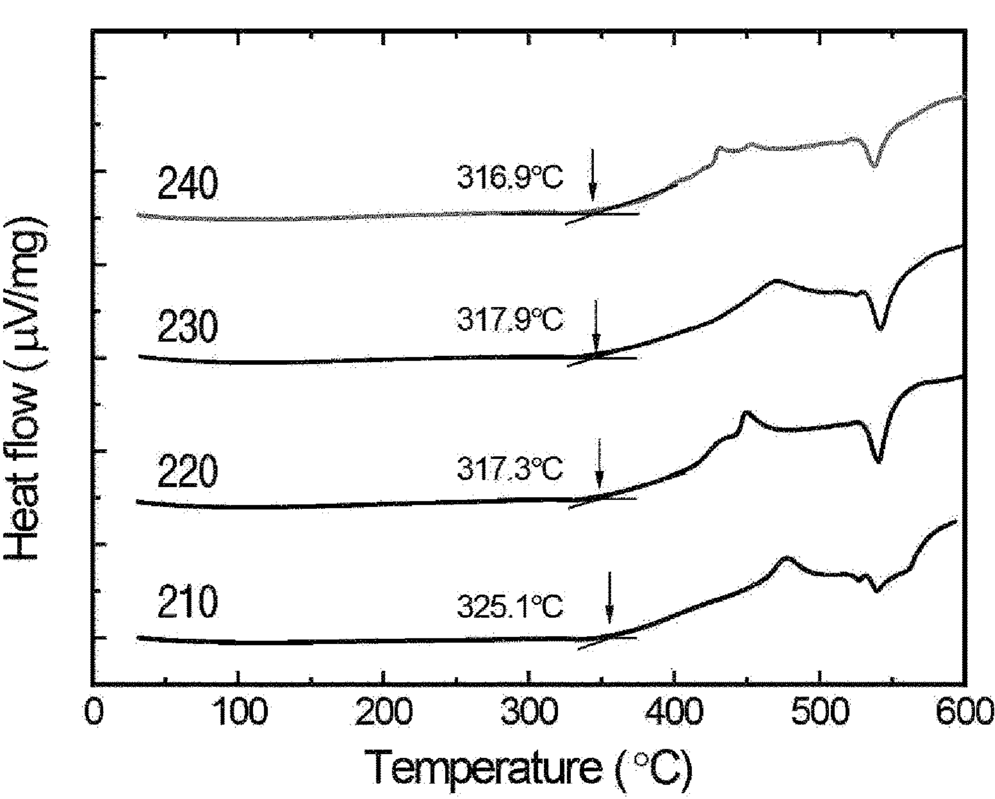
FIGS. 8 and 9 are graphs illustrating the thermal characteristics and the glass transition temperature depending on the temperature of the composition according to the first embodiment of the present invention.
Figure 9:
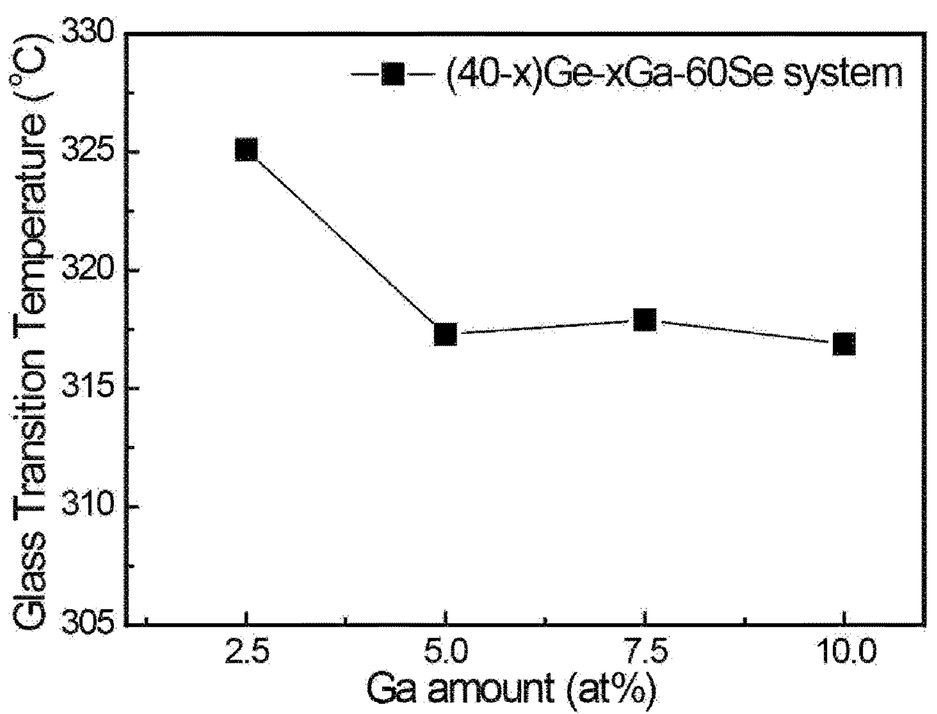

FIGS. 8 and 9 are graphs illustrating the thermal characteristics and the glass transition temperature depending on the temperature of the composition according to the first embodiment of the present invention.

FIG. 8 is a graph in which TG-DTA thermal analysis was performed on each optical glass 210 to 240. Referring to FIGS. 8 and 9, the optical glasses 210 to 240 have glass transition temperatures of 325.1° C., 317.3° C., 317.9° C. and 316.9° C., respectively. As the content of Ga in the raw materials forming the optical glass increased, the glass transition temperature showed a tendency to decrease. This is due to a decrease in the connection loss of the network and the Ga and Se bonding strength.

Figure 10:
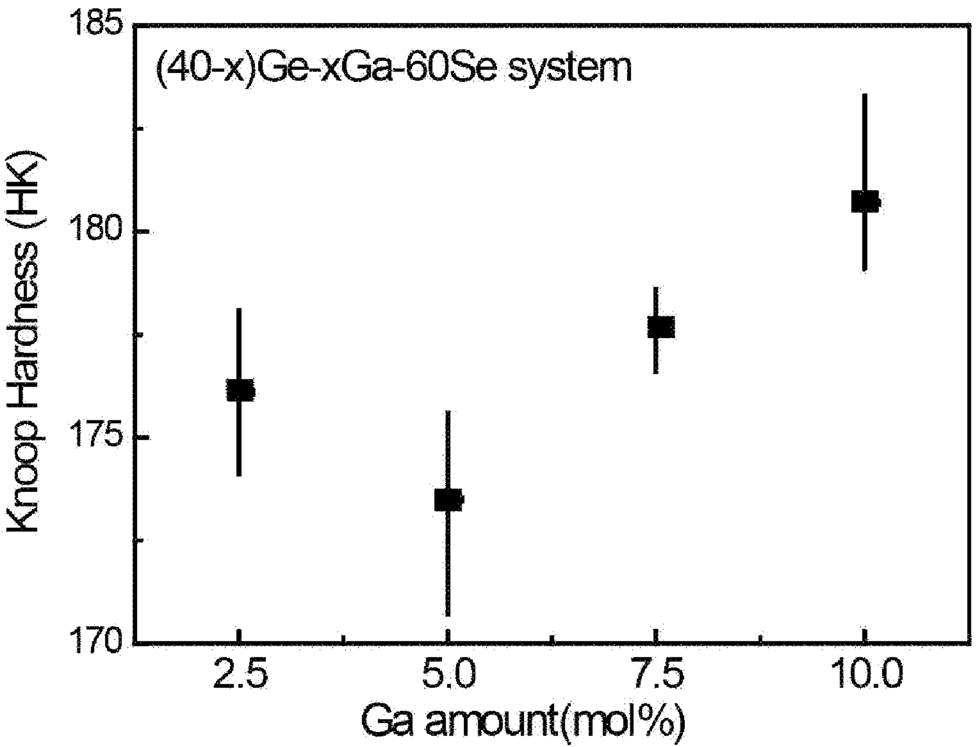
FIG. 10 is a graph illustrating the hardness of a composition according to the first embodiment of the present invention.

FIG. 10 is a graph illustrating the hardness of a composition according to the first embodiment of the present invention.

Hardness is a physical property of optical glass, and it is thereby possible to determine how strong it is against scratches caused by external force. Conventional (heavy metal-containing) far-infrared transmissive optical glasses commercially available have an average of 150 HK to 155 HK. In contrast, it could be identified that all of the optical glasses 210 to 240 had excellent hardness of 170 HK or more and that the hardness increased as more Ga was included from 5 mol % of Ga.

Figure 11:
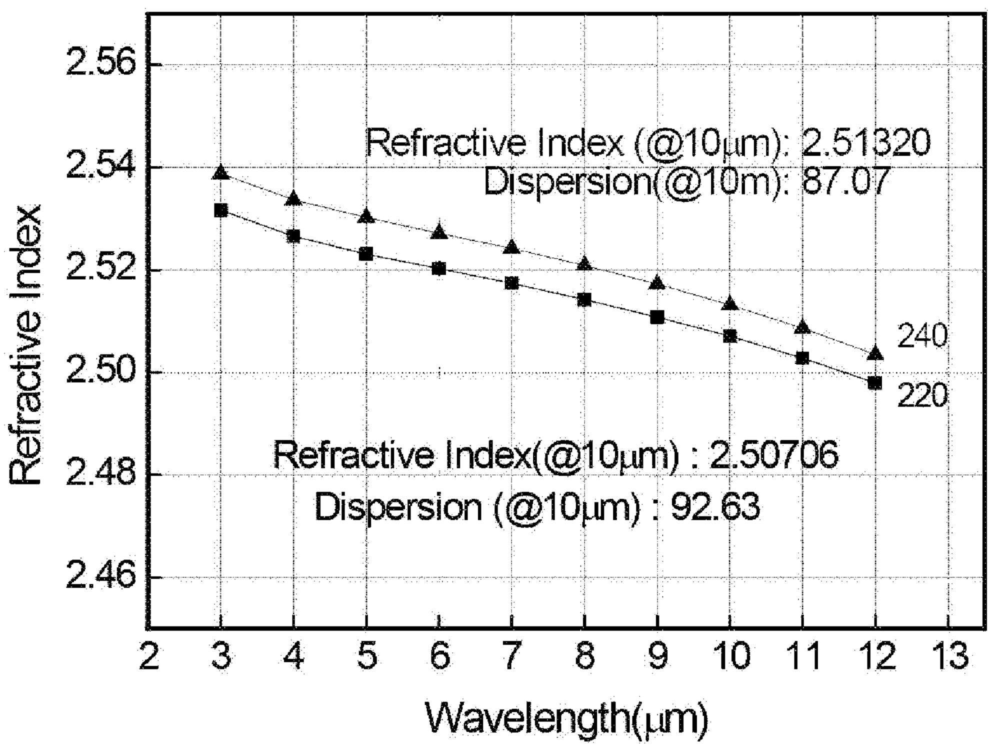
FIG. 11 is a graph illustrating the refractive index of a composition according to the first embodiment of the present invention.

FIG. 11 is a graph illustrating the refractive index of a composition according to the first embodiment of the present invention.

FIG. 11 is a graph of the refractive index measured every interval of 1 μm within a band of 3 μm to 12 μm in the optical glass 220 and the optical glass 240.

Both the optical glasses 220 and 240 had refractive indexes in the range from 2.50 to 2.52 in the far infrared light wavelength band (8 μm to 12 μm), and both had a refractive index of 2.4 or more. It could be identified that in the 10 μm wavelength band, both the optical glasses 220 and 240 had refractive indexes of 2.50706 and 2.51320, respectively, and in the wavelength band of 8 μm to 12 μmm, both the optical glasses 220 and 240 had dispersion values of 92.63 and 87.07, respectively, and thus had low dispersion characteristics.

Figure 12:
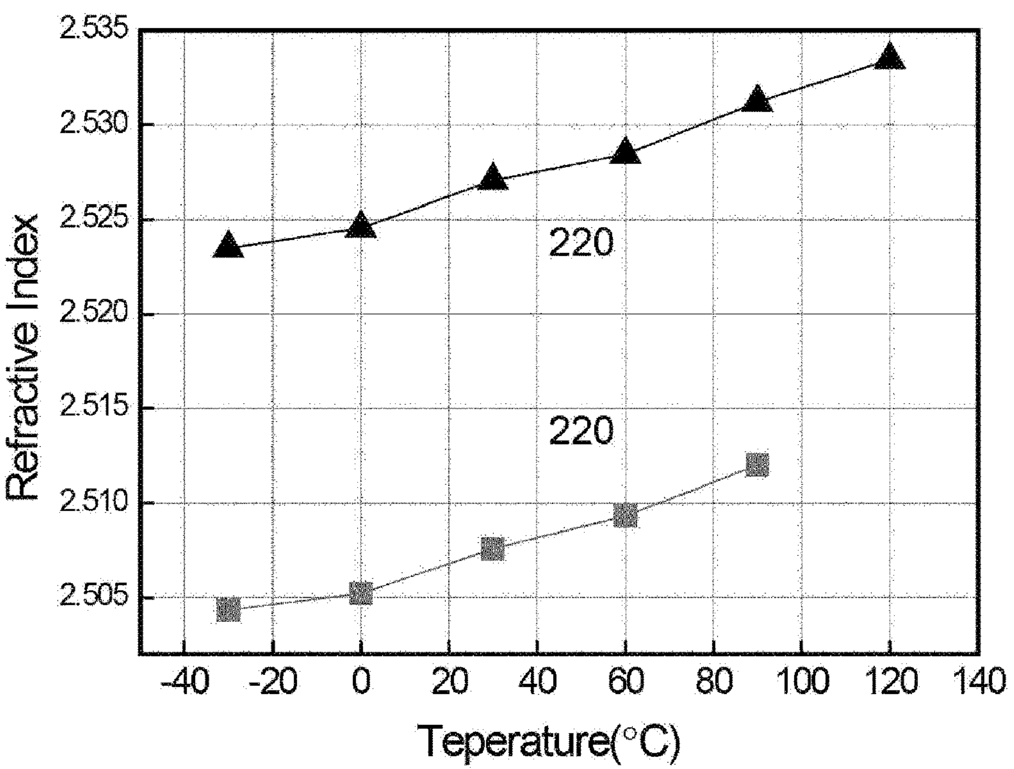
FIGS. 12 and 13 are graphs illustrating variations in refractive index depending on the temperature and wavelength of a composition according to the first embodiment of the present invention.
Figure 13:
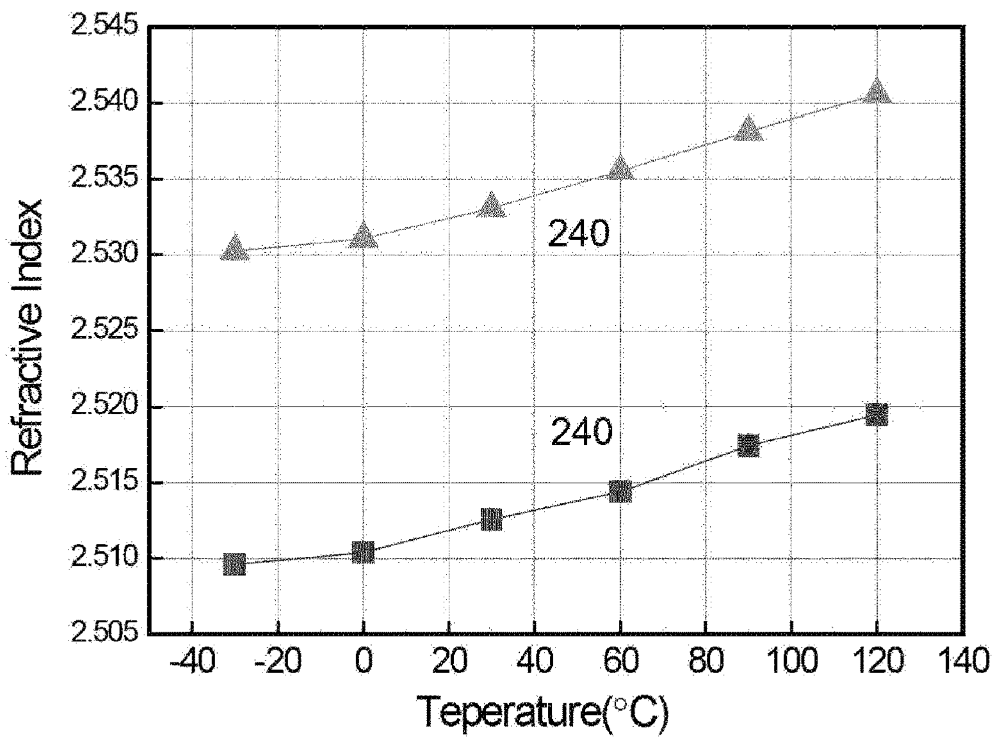

FIGS. 12 and 13 are graphs illustrating variations in refractive index depending on the temperature and wavelength of a composition according to the first embodiment of the present invention.

FIG. 12 is a graph illustrating changes in refractive index depending on temperatures for light in the wavelength band of 4 μmm and 10 μm of the optical glass 220. FIG. 13 is a graph illustrating changes in refractive index depending on temperatures for light in the wavelength band of 4 μm and 10 μm of the optical glass 240.

In both the optical glasses 220 and 240, even when the external temperature of the optical glass changes within the range of −40° C. to 120° C., the refractive index was only changed by 0.28% to 0.4%. In other words, it could be identified that the refractive indexes of both the optical glasses 220 and 240 were robust to temperature changes.

It could also be identified that for 10 μm light, the optical glass 220 had a dn/dT value of $63.6\times10^{-6}$ K, and the optical glass 240 had a dn/dT value of $63.6\times10^{-6}$ K. It could be identified that, given that the dn/dT value of conventional (heavy metal-containing) far-infrared transmissive glass commercially available was $61.1\times10^{-6}$ K (Schott IRG 25) to $67.1\times10^{-6}$ K (Schott IRG 22), there is no or little difference from the commercial products.

Referring to the above-described data, it could be identified that the optical glasses 210 to 240 manufactured with the first composition exhibited excellent physical properties (hardness), excellent refractive indexes and dispersion values, and typical glass transition temperatures and transmittances even though they do not contain a heavy metal.

FIG. 14 is a view illustrating the content of components constituting a composition for far-infrared transmissive glass according to a second embodiment of the present invention.

A composition for far-infrared transmissive glass according to a second embodiment of the present invention (hereinafter, simply referred to as a 'second composition') refers to a composition in which the raw materials are included in the following quantities.

1) Ge: 35 mol %, Ga: 5 mol %, Se: 60 mol % (220)
2) Ge: 35 mol %, Ga: 5 mol %, Se: 59 mol %, Te: 1 mol % (GGSe-1Te)
3) Ge: 35 mol %, Ga: 5 mol %, Se: 57 mol %, Te: 3 mol % (GGSe-3Te)
4) Ge: 35 mol %, Ga: 5 mol %, Se: 55 mol %, Te: 5 mol % (GGSe-5Te)
5) Ge: 35 mol %, Ga: 5 mol %, Se: 53 mol %, Te: 7 mol % (GGSe-7Te)

Te was contained by xmol %, Se was contained by (60−x) mol %, and Ge and Ga were contained by a ratio of 7:1 within 40 mol %. In this case, the content (x) of Te may be included as much as 1 mol % to 7 mol %. When Te is included as a dopant, the refractive index of the optical glass manufactured with the second composition is enhanced. If the refractive index is enhanced, focusability of incident light may be enhanced, and chromatic aberration may be reduced. Further, when the optical glass is processed into an optical component, the number of optical components to be included in a particular device may be reduced due to the high refractive index.

However, the contents of the raw materials of the above-described second composition are merely an example for describing the characteristics of the optical glass manufactured with the second composition to be described below, and embodiments of the present invention are not necessarily limited to the above-described contents. As in the first composition, Te and Se may have a content of 50 mol % to 70 mol %, and Ga and Ga may be included in a ratio of 3 to 15:1 in the remaining content except for the Se content. Hereinafter, the second composition 220 (GGSe-1Te, GGSe-3Te, GGSe-5Te, GGSe-7Te) in the above-described ratio is described for convenience of description, but the present invention is not limited thereto.

The optical glass formed of the second composition including the raw material in the above-described contents is shown in FIG. 15.

FIG. 15 is a view illustrating optical glass manufactured with a composition according to the second embodiment of the present invention. Here, the manufactured optical glass may be grown to have a diameter of a preset reference value, e.g., 35 mm or more, and may have an ingot shape. The optical glass manufactured with the composition according to the second embodiment of the present invention may grow into a diameter of up to 60 mm.

FIGS. 15A to 15D illustrate glasses implemented with the second compositions (GGSe-1Te, GGSe-3Te, GGSe-5Te, GGSe-7Te), respectively. Referring to FIGS. 15A to 15D, it could be identified that crystallization did not proceed in each second composition as they were implemented into glass.

Figure 16:
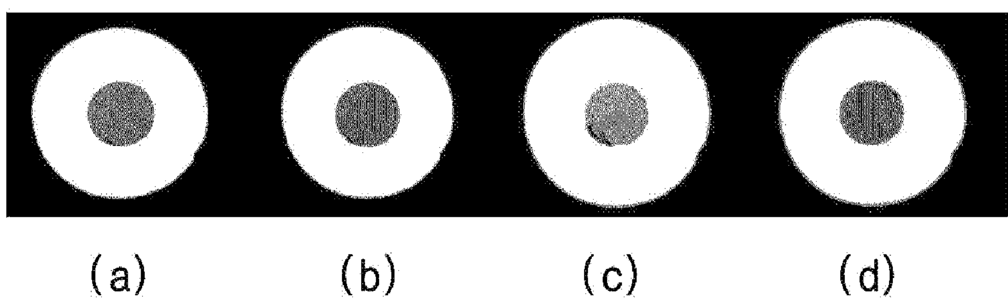
FIG. 16 is a view illustrating measuring internal defects in optical glass manufactured with a composition according to the second embodiment of the present invention.

FIG. 16 is a view illustrating measuring internal defects in optical glass manufactured with a composition according to the second embodiment of the present invention.

Referring to FIGS. 16A to 16D, it could be identified that optical glasses (GGSe-1Te, GGSe-3Te, GGSe-5Te, GGSe-7Te) had no internal defects and thus had excellent far-infrared transmittance.

Figure 17:
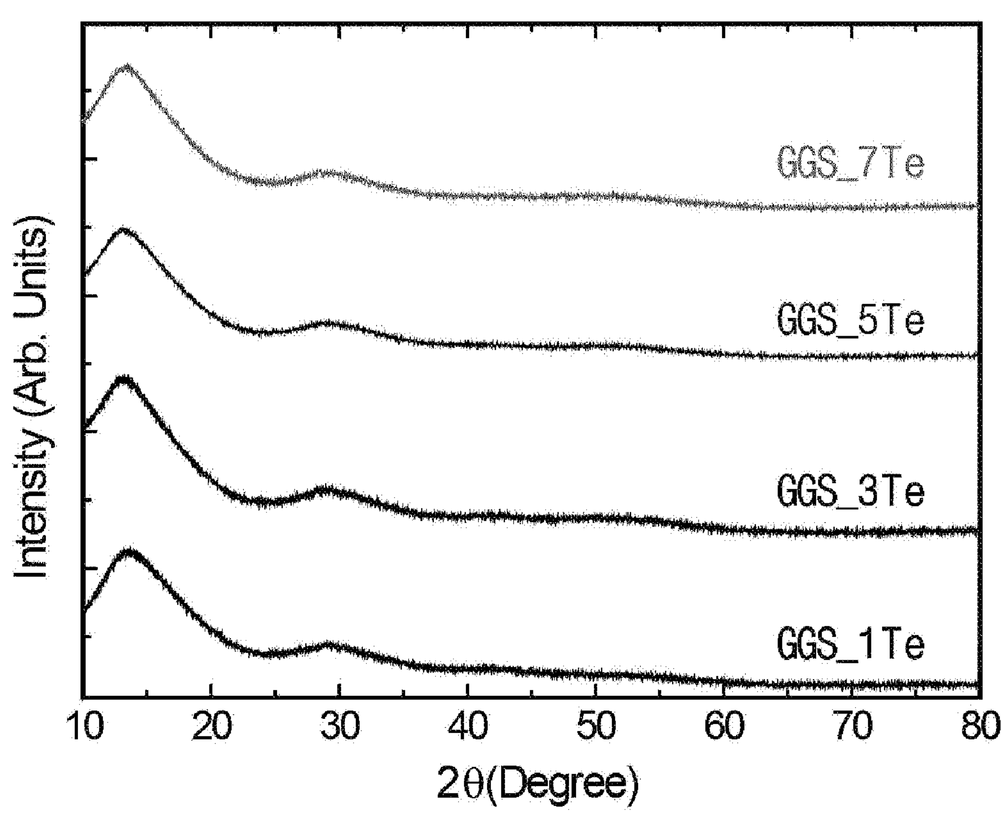
FIG. 17 is a graph illustrating properties for identifying vitrification of a composition according to the second embodiment of the present invention.

FIG. 17 is a graph illustrating properties for identifying vitrification of a composition according to the second embodiment of the present invention.

FIG. 17 is a graph illustrating the characteristics when each second composition is implemented with 35 mm optical glass. It could be identified that, in the optical glasses (GGSe-1Te, GGSe-3Te, GGSe-5Te, GGSe-7Te), no crystallization peak was found at every angle and they all were vitrified. In other words, it may be identified that each optical glass implemented from the second composition may have excellent far-infrared light transmittance because crystallization does not occur therein.

Figure 18:
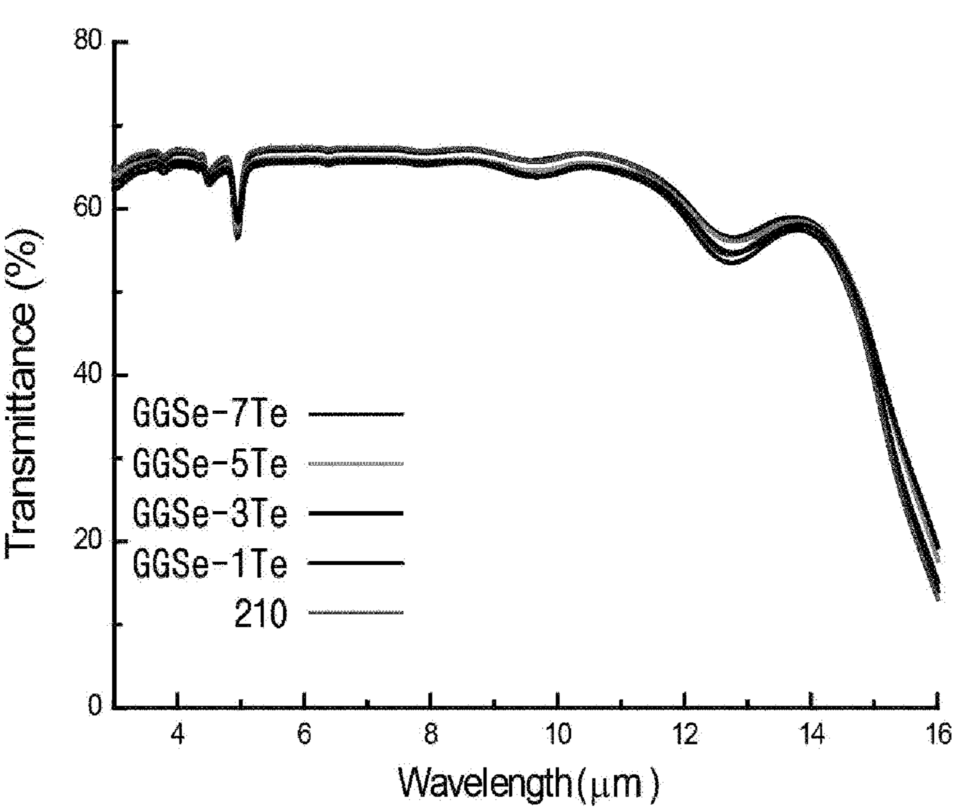
FIG. 18 is a graph illustrating the transmittance in a far-infrared wavelength band of a composition according to the second embodiment of the present invention.

FIG. 18 is a graph illustrating the transmittance in a far-infrared wavelength band of a composition according to the second embodiment of the present invention.

FIG. 18 is a graph illustrating the characteristics when each second composition is implemented with 4 mm optical glass. It could be identified that each optical glass (GGSe-1Te, GGSe-3Te, GGSe-5Te, GGSe-7Te) had an average transmittance of 60% or more in the 8 μm to 12 μm band, which is a far-infrared wavelength band. More specifically, an average transmittance of 65.80% for the optical glass (GGSe-1Te), 64.14% for the optical glass (GGSe-3Te), 63.87% for the optical glass (GGSe-5Te), and 64.23% for the optical glass (GGSe-7Te) were exhibited.

Figure 19:
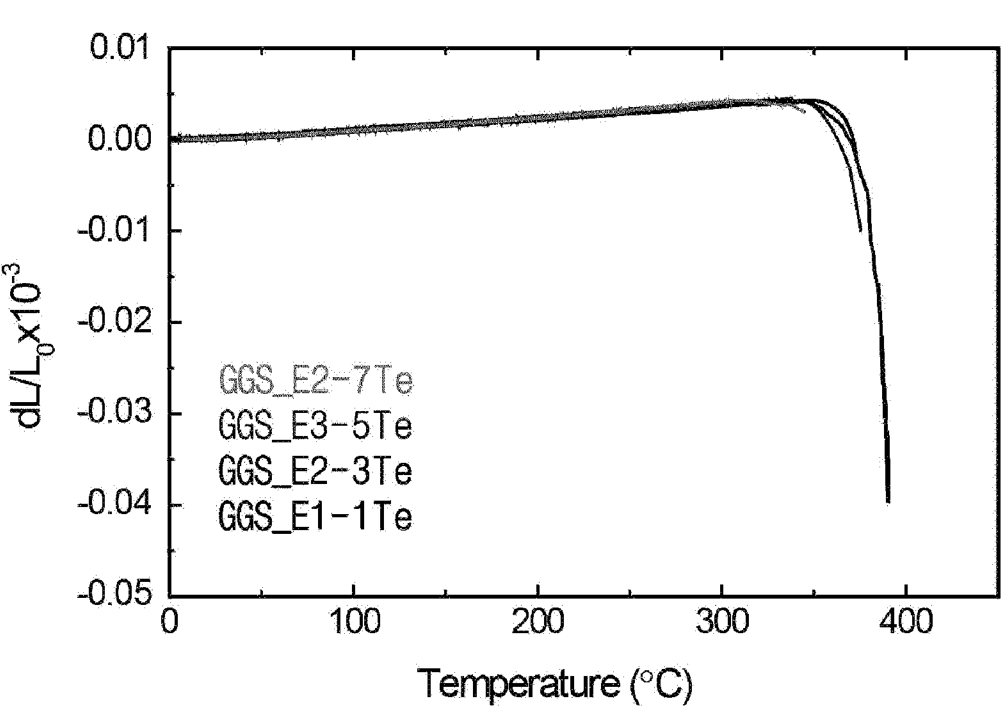
FIG. 19 is a graph illustrating the thermal expansion coefficient of a composition according to the second embodiment of the present invention.

FIG. 19 is a graph illustrating the thermal expansion coefficient of a composition according to the second embodiment of the present invention.

All of the optical glasses (GGSe-1Te, GGSe-3Te, GGSe-5Te, GGSe-7Te) exhibited a significantly low change in thermal expansion coefficient even at a temperature change of about 350° C. The optical glasses (GGSe-1Te, GGSe-3Te, GGSe-5Te, GGSe-7Te) had significantly low thermal expansion coefficients, i.e., $12.7955\times10^{-6}$ K, $12.7527\times10^{-6}$ K, $12.8338\times10^{-6}$ K, and $13.2806\times10^{-6}$ K, respectively, and exhibited a tendency of increasing depending on the content of Te. It may be identified that there is no big difference from that of the conventional (heavy metal-containing) far-infrared transmissive glass commercially available. Among conventional (heavy metal-containing) far-infrared transmissive glasses, a product with excellent thermal expansion coefficient (IRG 22 from Schott) exhibited $12.5\times10^{-6}$ K, and others exhibited $14.0\times10^{-6}$ K (IRG 25 from Schott), $20.0\times10^{-6}$ K (IRG 24 from Schott), or $21.4\times10^{-6}$ K (IRG 26 from Schott). Referring to these, it could be identified that the optical glasses (GGSe-1Te, GGSe-3Te, GGSe-5Te, GGSe-7Te) has thermal expansion coefficients similar or superior to those of the commercially available products.

Figure 20:
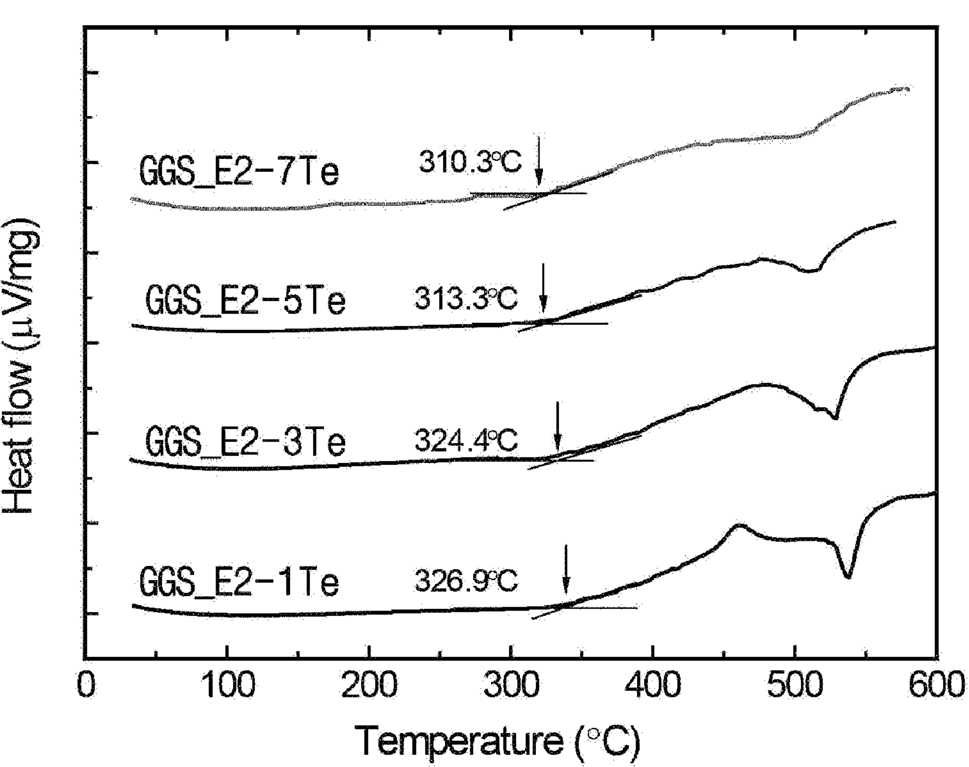
FIGS. 20 and 21 are graphs illustrating the thermal characteristics and the glass transition temperature depending on the temperature of the composition according to the second embodiment of the present invention.
Figure 21:
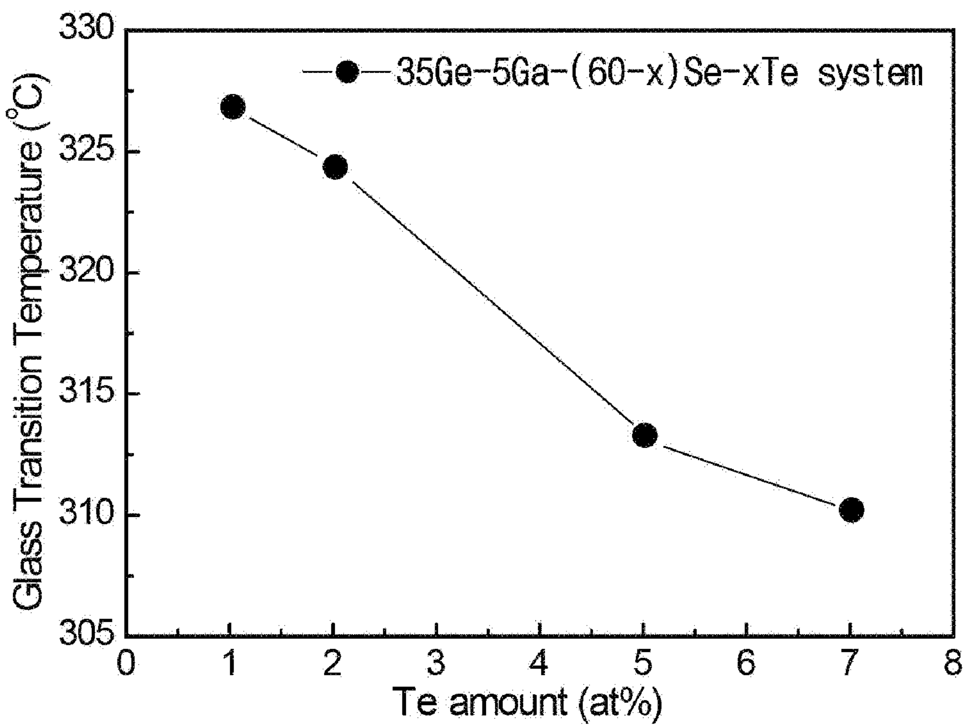

FIGS. 20 and 21 are graphs illustrating the thermal characteristics and the glass transition temperature depending on the temperature of the composition according to the second embodiment of the present invention.

FIG. 20 is a graph obtained by performing TG-DTA thermal analysis on each optical glass (GGSe-1Te, GGSe-3Te, GGSe-5Te, GGSe-7Te). Referring to FIGS. 20 and 21, the optical glasses (GGSe-1Te, GGSe-3Te, GGSe-5Te, GGSe-7Te) have glass transition temperatures of 326.9° C., 324.4° C., 313.3° C. and 310.3° C., respectively. As the content of Te in the raw materials forming the optical glass increased, the glass transition temperature showed a tendency to decrease. Due to the linear increase in density according to $Z_{Te}>Z_{se}$ (where, Z is the number of atoms) and the atomic radius of Te larger than that of Se, if the amount of Te increases, the glass transition temperature decreases.

Figure 22:
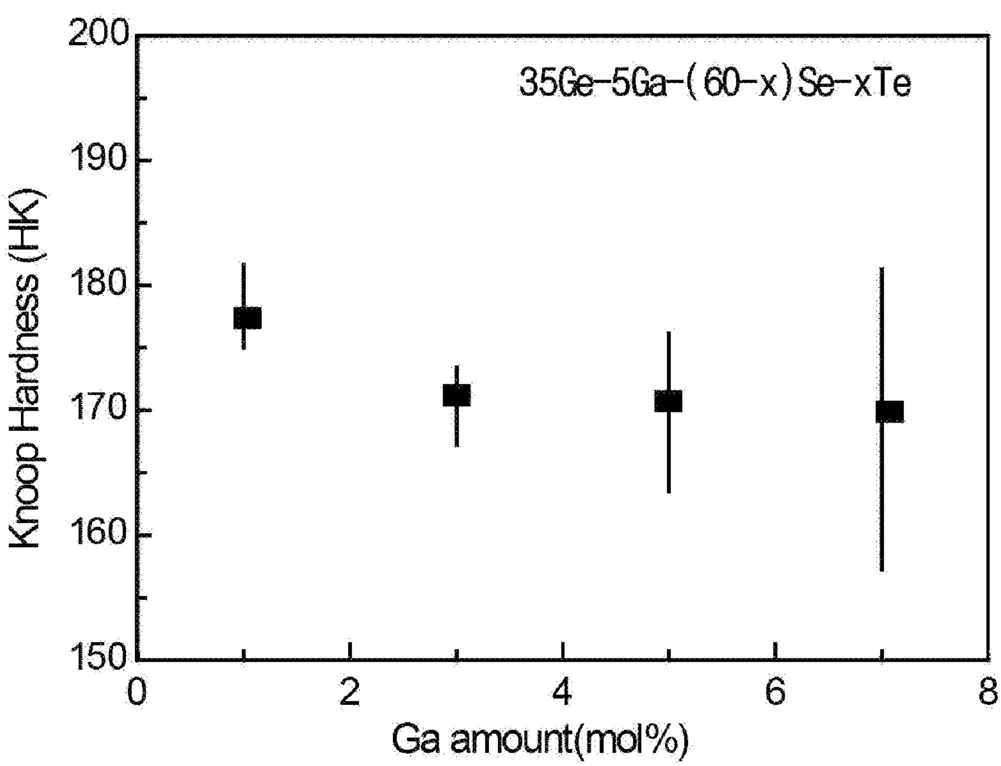
FIG. 22 is a graph illustrating the hardness of a composition according to the second embodiment of the present invention.

FIG. 22 is a graph illustrating the hardness of a composition according to the second embodiment of the present invention.

It could be identified that all of the optical glasses (GGSe-1Te, GGSe-3Te, GGSe-5Te, GGSe-7Te) had excellent hardness of 170 HK or more and that the hardness decreased as the content of Te increased.

Figure 23:
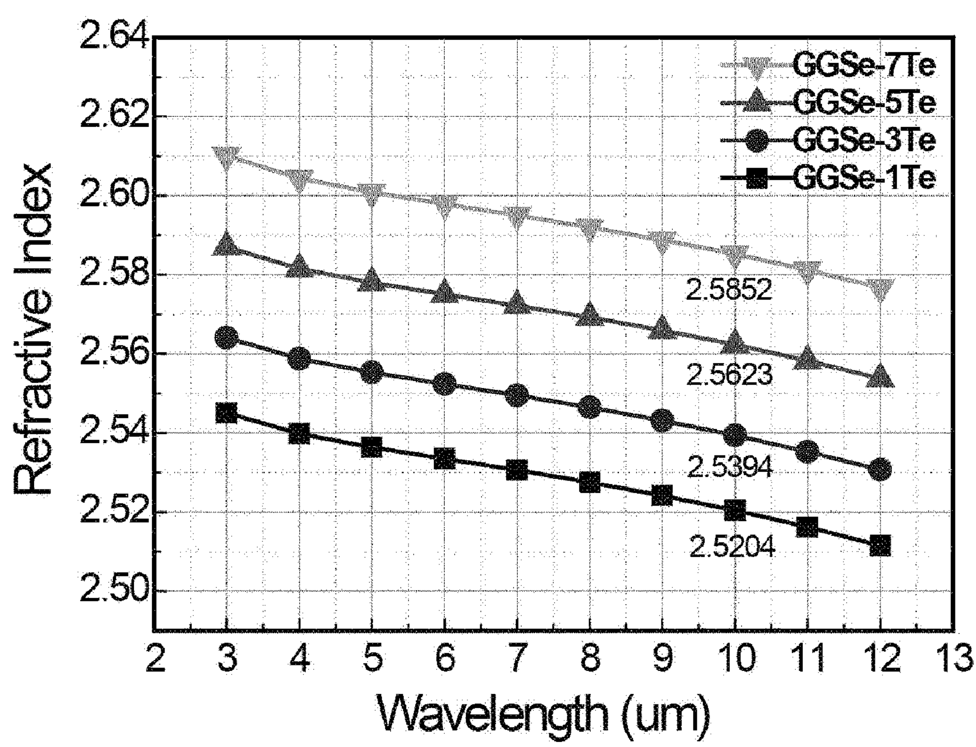
FIG. 23 is a graph illustrating the refractive index of a composition according to the second embodiment of the present invention.
Figure 26A:
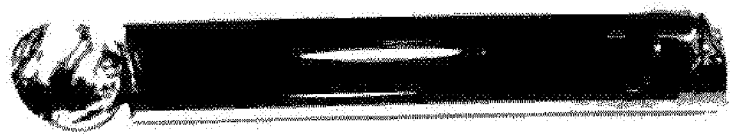
FIG. 26 is a view illustrating optical glass manufactured with a composition according to the third embodiment of the present invention.
Figure 26B:
Figure 26C:
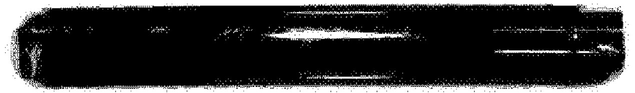
Figure 26D:

FIG. 23 is a graph illustrating the refractive index of a composition according to the second embodiment of the present invention.

Each of the optical glasses (GGSe-1Te, GGSe-3Te, GGSe-5Te, GGSe-7Te) had a refractive index in the range from 2.51 to 2.61 in the far-infrared wavelength band (8 μm to 12 μm), and all of the optical glasses had an excellent refractive index of 2.5 or more. As the content of the dopant Te increased, the refractive index of the optical glass increased. It could be identified that in particular, in the 10 μm wavelength band, the optical glasses (GGSe-1Te, GGSe-3Te, GGSe-5Te, GGSe-7Te) had refractive indices of 2.5204, 2.5394, 2.5623 and 2.5852, respectively, so that the refractive index was significantly enhanced as compared with when no dopant was contained.

FIG. 24 is a view illustrating the dispersion value of a composition according to the second embodiment of the present invention.

The table shown in FIG. 24 indicates the per-wavelength band refractive indexes for each optical glass (GGSe-1Te, GGSe-3Te, GGSe-5Te, GGSe-7Te). With reference to this, the dispersion value in the 8 μm to 12 μm wavelength band of each optical glass (GGSe-1Te, GGSe-3Te, GGSe-5Te, GGSe-7Te) may be calculated as follows.

$$v = \frac{n_{10\mu m} - 1}{n_{8\mu m} - n_{12\mu m}}$$

Here, v denotes the dispersion value in the wavelength band of 8 μm to 12 μm, and n denotes the refractive index in each wavelength band. It could be identified that the optical glasses (GGSe-1Te, GGSe-3Te, GGSe-5Te, GGSe-7Te) had dispersion values of 94.67, 97.43, 100.99 and 103.88, respectively, and that the dispersion value increased as the content of the dopant Te increased.

In other words, it could be identified that optical glass containing Te as a dopant had a fairly excellent refractive index and excellent low dispersion characteristics.

FIG. 25 is a view illustrating the content of components constituting a composition for far-infrared transmissive glass according to a third embodiment of the present invention.

A composition for far-infrared transmissive glass according to a third embodiment of the present invention (hereinafter, simply referred to as a 'third_composition') refers to a composition in which the raw materials are included in the following quantities.

1) Ge: 35 mol %, Ga: 5 mol %, Se: 60 mol % (220)
2) Ge: 35 mol %, Ga: 5 mol %, Se: 57.5 mol %, S: 2.5 mol % (GGSe-2.5S)
3) Ge: 35 mol %, Ga: 5 mol %, Se: 55 mol %, S: 5 mol % (GGSe-5S)
4) Ge: 35 mol %, Ga: 5 mol %, Se: 52.5 mol %, S: 7.5 mol % (GGSe-7.5S)
5) Ge: 35 mol %, Ga: 5 mol %, Se: 50 mol %, S: 10 mol % (GGSe-10S)

6) Ge: 35 mol %, Ga: 5 mol %, Se: 40 mol %, S: 20 mol % (GGSe-20S)
7) Ge: 35 mol %, Ga: 5 mol %, Se: 30 mol %, S: 30 mol % (GGSe-30S)
8) Ge: 35 mol %, Ga: 5 mol %, Se: 20 mol %, S: 40 mol % (GGSe-40S)
9) Ge: 35 mol %, Ga: 5 mol %, Se: 10 mol %, S: 50 mol % (GGSe-50S)
10) Ge: 35 mol %, Ga: 5 mol %, Se: 0 mol %, S: 60 mol % (GGSe-60S)

S was contained by x mol %, Se was contained by (60−x) mol %, and Ge and Ga were contained by a ratio of 7:1 within 40 mol %. In this case, the content (x) of S may be included as much as 60 mol %. When S is included as a dopant, the dispersion value of the optical glass manufactured with the third composition increases, so that it may be processed into an optical component having a high dispersion value.

Likewise, the contents of the raw materials of the above-described third composition are merely an example for describing the characteristics of the optical glass manufactured with the third composition to be described below, and embodiments of the present invention are not necessarily limited to the above-described contents. As in the first composition, Se and S may have a content of 50 mol % to 70 mol %, and Ga and Ga may be included in a ratio of 3 to 15:1 in the remaining content except for the Se content. Hereinafter, for convenience purposes, the description will be made based on the third composition (GGSe-2.5S to GGSe-60S), but embodiments are not limited thereto.

The optical glass formed of the third composition including the raw material in the above-described contents is shown in FIG. 26.

FIG. 26 is a view illustrating optical glass manufactured with a composition according to the third embodiment of the present invention. Here, the manufactured optical glass may be grown to have a diameter of a preset reference value, e.g., 35 mm or more, and may have an ingot shape. The optical glass manufactured with the composition according to the third embodiment of the present invention may grow into a diameter of up to 60 mm.

FIGS. 26A to 26D illustrate glasses implemented with the third compositions (GGSe-10S to GGSe-40S), respectively. Referring to FIGS. 26A to 26D, it could be identified that crystallization did not proceed in each third composition as they were implemented into glass.

Figure 27:
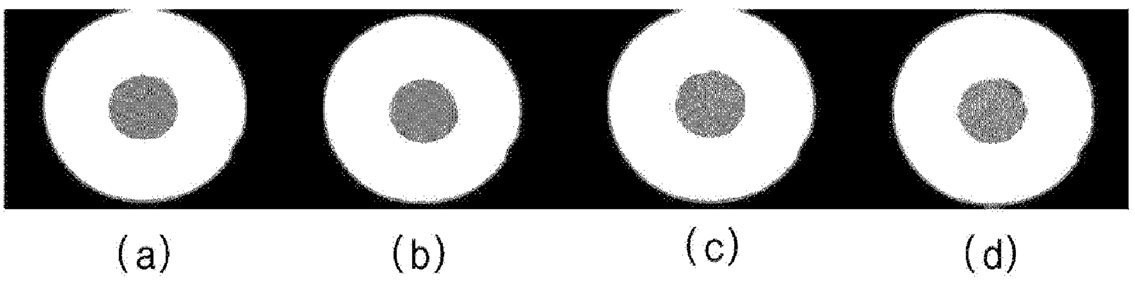
FIG. 27 is a view illustrating measuring internal defects in optical glass manufactured with a composition according to the third embodiment of the present invention.

FIG. 27 is a view illustrating measuring internal defects in optical glass manufactured with a composition according to the third embodiment of the present invention.

Referring to FIGS. 27A to 27D, it could be identified that the optical glasses GGSe-10S to GGSe-40S had superior far-infrared transmittance because they had no internal defect.

Figure 28:
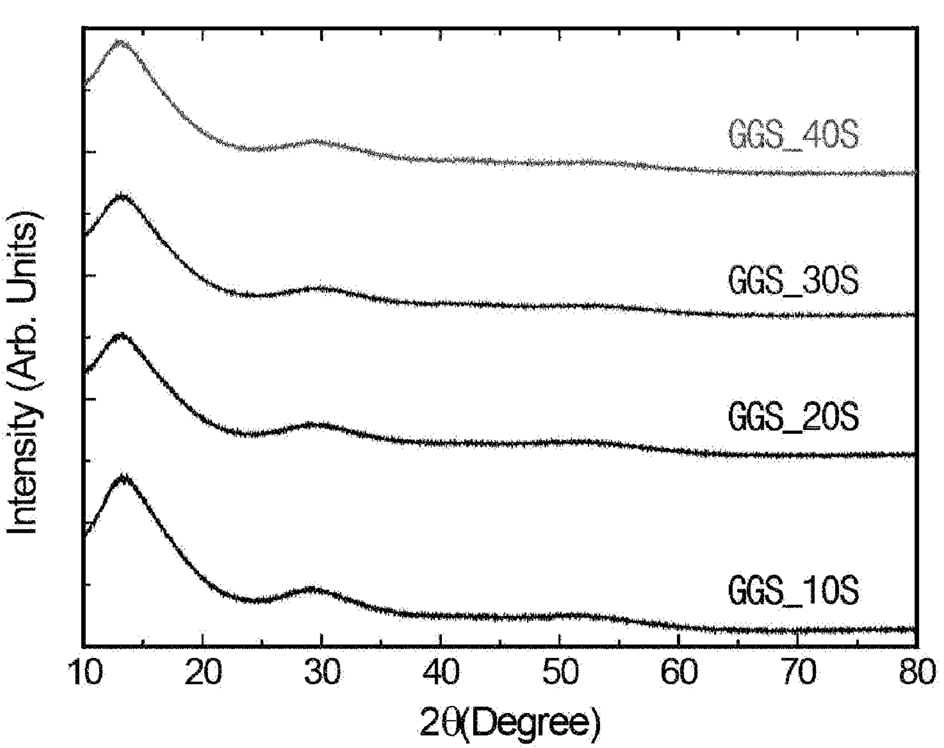
FIG. 28 is a graph illustrating properties for identifying vitrification of a composition according to the third embodiment of the present invention.

FIG. 28 is a graph illustrating properties for identifying vitrification of a composition according to the third embodiment of the present invention.

FIG. 28 is a graph illustrating the characteristics when each third composition is implemented with 35 mm optical glass. It could be identified that the optical glasses (GGSe-10S to GGSe-40S) all had no crystallization peak found therein and all were vitrified. In other words, it may be identified that each optical glass implemented from the third composition may have excellent far-infrared light transmittance because crystallization does not occur therein.

Figure 29:
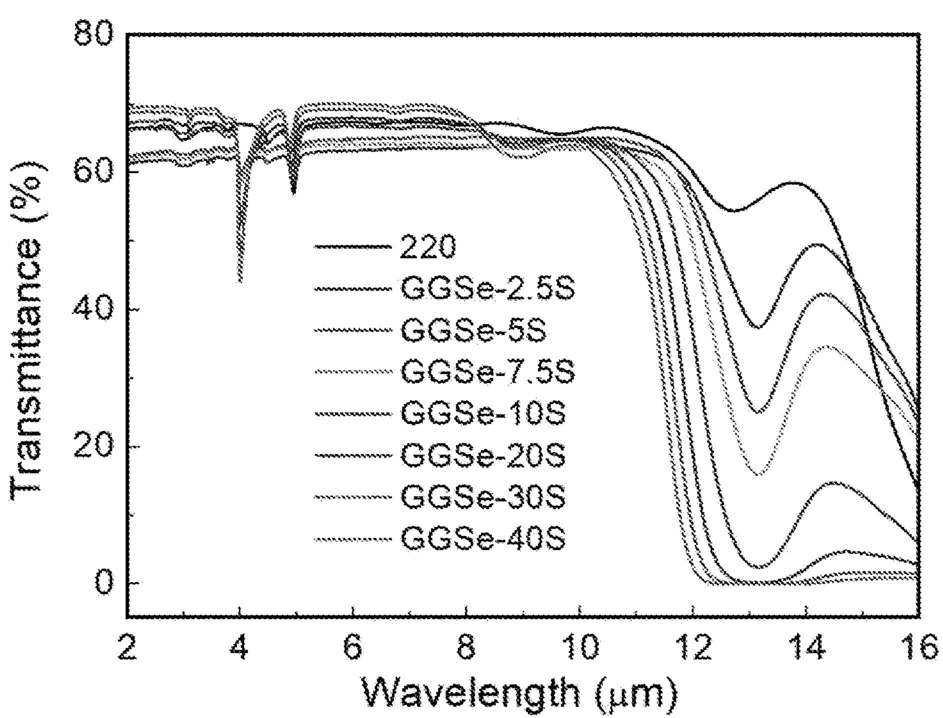
FIGS. 29 and 30 are graphs illustrating the transmittance in a far-infrared wavelength band of a composition according to the third embodiment of the present invention.
Figure 30:
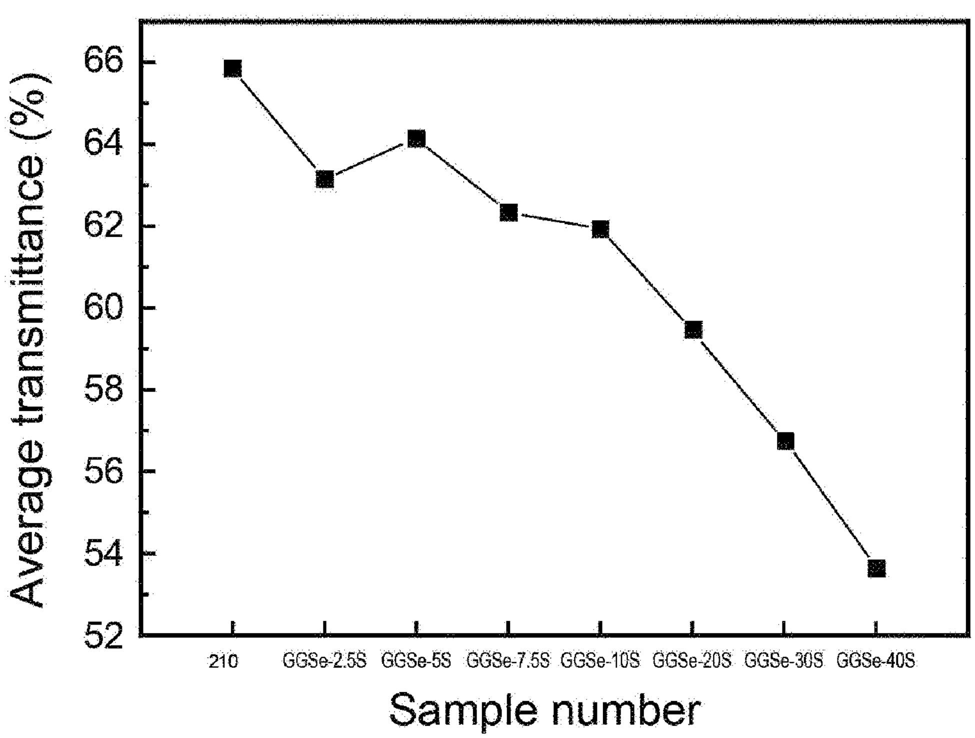

FIGS. 29 and 30 are graphs illustrating the transmittance in a far-infrared wavelength band of a composition according to the third embodiment of the present invention.

FIGS. 29 and 30 are graphs illustrating the characteristics when each third composition is implemented with 4 mm optical glass. It could be identified that each optical glass GGSe-2.5S to GGSe-40S had an average transmittance of 50% or more in the 8 to 12 μm band, which is a far-infrared wavelength band. More specifically, the optical glass (GGSe-2.5S) exhibited an average transmittance of 63.2%, the optical glass (GGSe-5S) 64.2%, the optical glass (GGSe-7.5S) 62.4%, the optical glass (GGSe-10S) 62%, the optical glass (GGSe-20S) 59.5%, the optical glass (GGSe-30S) 56.8%, and the optical glass (GGSe-40S) 53.7%. As the content of S decreased, the transmittance showed a tendency to increase. When an anti-reflection coating or the like is applied to the optical glass, it may have a higher transmittance.

Figure 31:
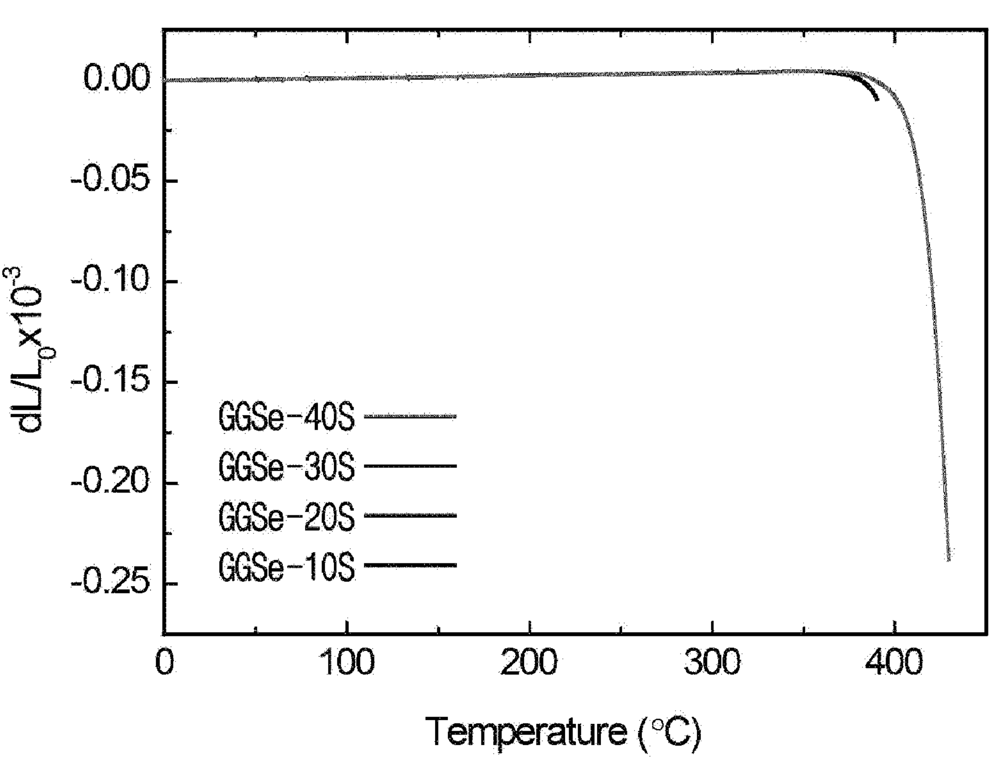
FIG. 31 is a graph illustrating the thermal expansion coefficient of a composition according to the third embodiment of the present invention.

FIG. 31 is a graph illustrating the thermal expansion coefficient of a composition according to the third embodiment of the present invention.

All of the optical glasses GGSe-10S to GGSe-40S exhibited a significantly low change in thermal expansion coefficient even at a temperature change of about 350° C. The optical glasses (GGSe-10S to GGSe-40S) had thermal expansion coefficients of $12.2702\times10^{-6}$ K, $12.5033\times10^{-6}$ K, $11.9670\times10^{-6}$ K, and $12.1307\times10^{-6}$ and exhibited no tendency, and they had fairly thermal expansion coefficients. This becomes clearer when compared with the thermal expansion coefficient of the conventional (heavy metal-containing) far-infrared transmissive glass that is commercially available. Among conventional (heavy metal-containing) far-infrared transmissive glasses, a product with excellent thermal expansion coefficient (IRG 22 from Schott) exhibited $12.5\times10^{-6}$ K, and others exhibited $14.0\times10^{-6}$ K (IRG 25 from Schott), $20.0\times10^{-6}$ K (IRG 24 from Schott), or $21.4\times10^{-6}$ K (IRG 26 from Schott). Referring to these, it could be identified that each optical glass (GGSe-10S to GGSe-40S) had a thermal expansion coefficient similar to or superior to that of commercially available products.

Figure 32:
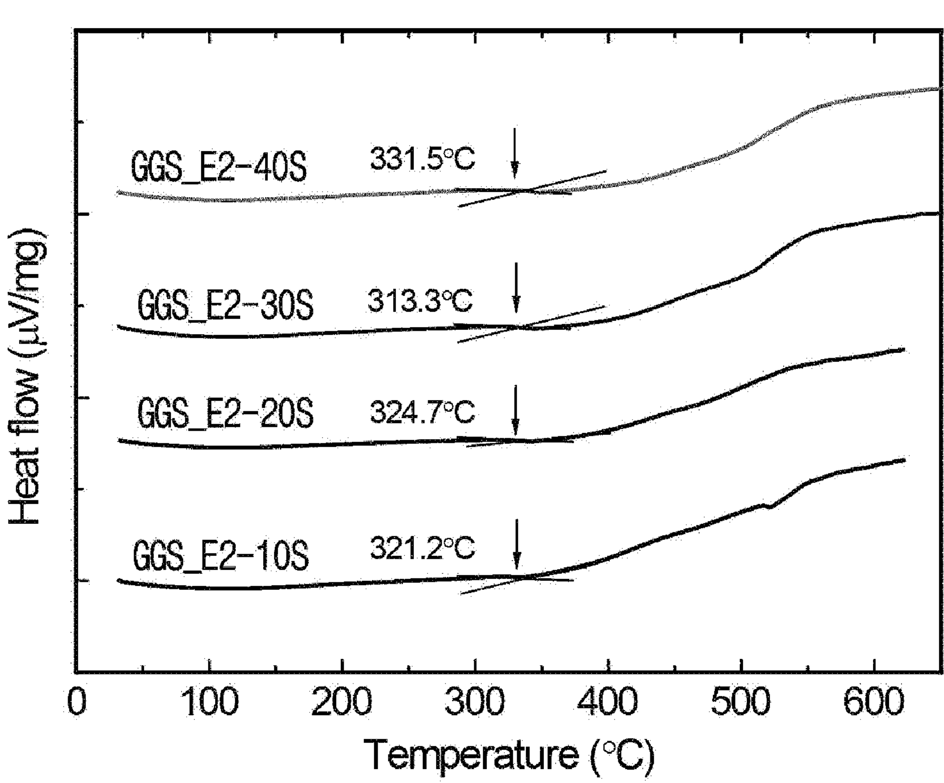
FIGS. 32 and 33 are graphs illustrating the thermal characteristics and the glass transition temperature depending on the temperature of the composition according to the third embodiment of the present invention.
Figure 33:
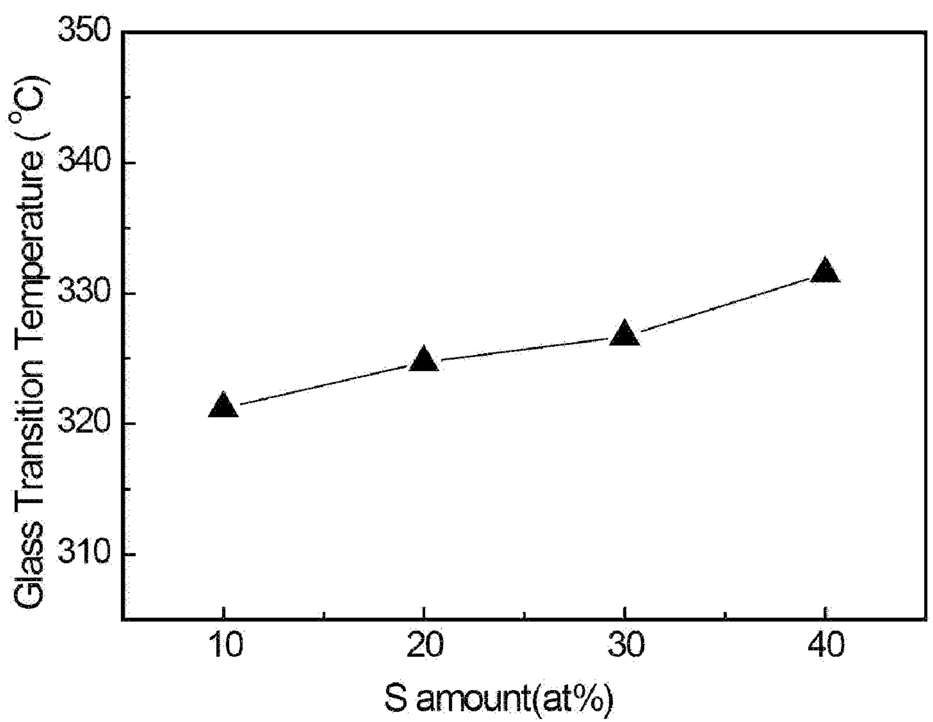

FIGS. 32 and 33 are graphs illustrating the thermal characteristics and the glass transition temperature depending on the temperature of the composition according to the third embodiment of the present invention.

FIG. 32 is a graph obtained by performing TG-DTA thermal analysis on each optical glass (GGSe-10S to GGSe-40S). Referring to FIGS. 32 and 33, the optical glasses GGSe-10S to GGSe-40S have glass transition temperatures of 321.2° C., 324.7° C., 313.3° C. and 331.5° C., respectively. As the content of S in the raw materials forming the optical glass increased, the glass transition temperature showed a tendency to increase. This is why as the content of S increases, $GeS_4$ units with a coordination number of 4 are more configured instead of $GeSe_2$ units with a coordination number of 2, so that the network connectivity is enhanced. This is also because the strength of the Ge—S bond (279 KJ/mol) is stronger than the strength of the Ge—Se bond (230 KJ/mol).

Figure 34:
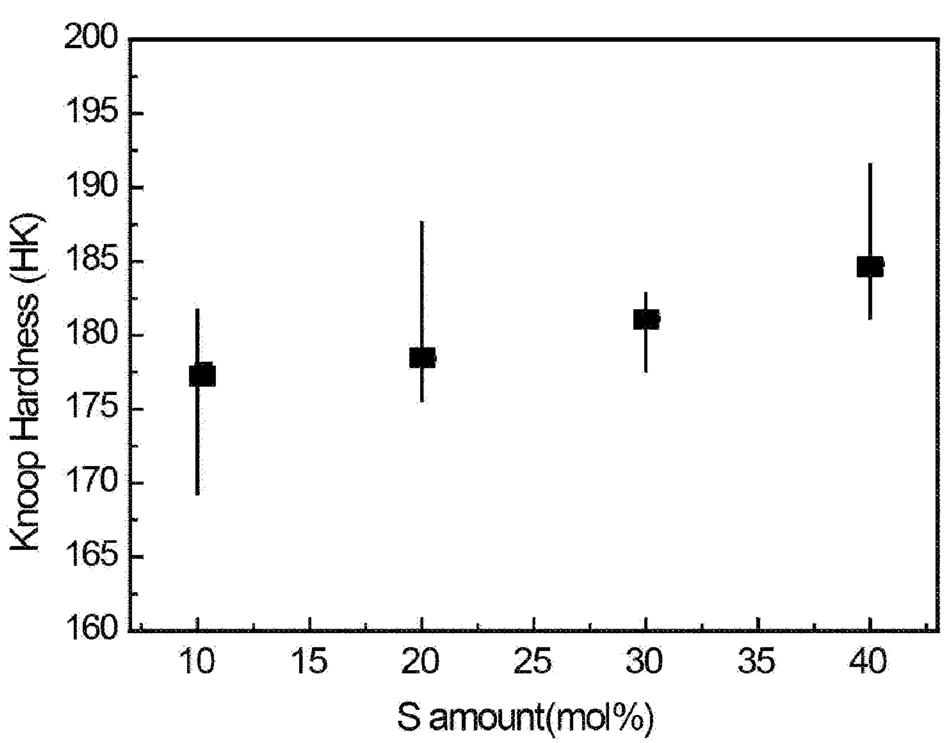
FIG. 34 is a graph illustrating the hardness of a composition according to the third embodiment of the present invention.

FIG. 34 is a graph illustrating the hardness of a composition according to the third embodiment of the present invention.

It could be identified that all of the optical glasses (GGSe-10S to GGSe-40S) had excellent hardness of 175 HK or more and that the hardness increased as the content of S increased.

Figure 35:
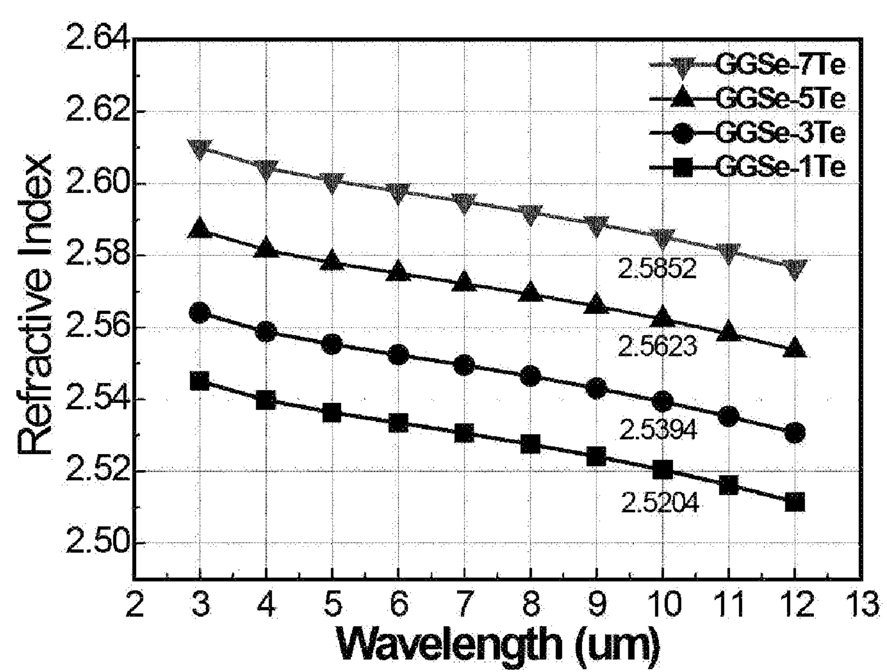
FIG. 35 is a graph illustrating the refractive index of a composition according to the third embodiment of the present invention.

FIG. 35 is a graph illustrating the refractive index of a composition according to the third embodiment of the present invention.

Each of the optical glasses (GGSe-2.5S, GGSe-5S, GGSe-7.5S) had a refractive index in the range from 2.46 to 2.5 in the far-infrared wavelength band (8 μm to 12 μm), and all of the optical glasses had an excellent refractive index of 2.45 or more. As the content of the dopant S decreased, the refractive index of the optical glass increased.

FIG. 36 is a view illustrating the dispersion value of a composition according to the third embodiment of the present invention.

The table shown in FIG. 36 indicates the per-wavelength band refractive indexes for each optical glass (GGSe-2.5S, GGSe-5S, GGSe-7.5S). With reference to this, the dispersion value in the 8 μm to 12 μm wavelength band of each optical glass (GGSe-2.5S, GGSe-5S, GGSe-7.5S) is as follows. It could be identified that the optical glasses (GGSe-2.5S, GGSe-5S, GGSe-7.5S) had relatively low dispersion properties of 87.2, 85.8, and 82.3, respectively, as dispersion values and that the dispersion value increased as the content of the dopant S decreased.

In other words, it could be identified that optical glass containing S as a dopant had an excellent refractive index and excellent low dispersion characteristics.

Although FIG. 1 illustrates that the steps are sequentially performed, this merely provides an embodiment of the disclosure. It would readily be appreciated by a skilled artisan that the steps of FIG. 1 are not limited to the order shown but may rather be performed in a different order, one or more of the steps may simultaneously be performed, or other various modifications or changes may be made thereto without departing from the scope of the disclosure The steps or processes described above in connection with FIG. 1 may be implemented as computer-readable code in a recording medium. The computer-readable recording medium includes all types of recording devices storing data readable by a computer system. The computer-readable recording medium includes a storage medium, such as a magnetic storage medium (e.g., a ROM, a floppy disk, or a hard disk) or an optical reading medium (e.g., a CD-ROM or a DVD). Further, the computer-readable recording medium may be distributed to computer systems connected via a network, and computer-readable codes may be stored and executed in a distributed manner.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

This invention was made with Korean government support, as a result of research project conducted in 2020 under support by the Korea Evaluation Institute of Industrial Technology (Project No.: 1415168029; Sub Project No.: 20002803, Project Title: Development of As- and Sb-free far-infrared optical glass for mobile device and lens core technology) and awarded by the Ministry of Trade, Industry and Energy and as a result of research project conducted in 2021 under support by the Korea Institute for Advancement of Technology (Sub Project No.: P0017725; Project Title: Support for industrialization of optical materials for camera lenses) and awarded by the Ministry of Trade, Industry and Energy.

The invention claimed is:

1. A composition for glass transmitting an infrared wavelength band of light by 60% or more and having a hardness of 170 HK or more and a refractive index of 2.5 or more, wherein the composition consists of 22.5 mol % to 46.875 mol % of Ge, 1.875 mol % to 12.5 mol % of Ga, 43 mol % to 69 mol % of Se, and 1 mol % to 7 mol % of Te.

2. A composition for glass transmitting an infrared wavelength band and having a hardness of 175 HK or more and a refractive index of 2.45 or more, wherein the composition consists of 22.5 mol % to 46.875 mol % of Ge, 1.875 mol % to 12.5 mol % of Ga, 10 mol % to 57.5 mol % of Se, and 2.5 mol % to 50 mol % of S.

* * * * *